US012615405B2

(12) United States Patent
Panchaksharaiah et al.

(10) Patent No.: US 12,615,405 B2
(45) Date of Patent: Apr. 28, 2026

(54) SYSTEM AND METHODS FOR PROVIDING IN-VEHICLE CONTENT DURING VEHICLE OPERATION

(71) Applicant: Adeia Guides Inc., San Jose, CA (US)

(72) Inventors: Vishwas Sharadanagar Panchaksharaiah, Tiptur (IN); Vikram Makam Gupta, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 450 days.

(21) Appl. No.: 18/114,738

(22) Filed: Feb. 27, 2023

(65) Prior Publication Data

US 2024/0292047 A1 Aug. 29, 2024

(51) Int. Cl.

| | |
|---|---|
| *H04N 21/41* | (2011.01) |
| *B60K 35/29* | (2024.01) |
| *H04N 21/414* | (2011.01) |
| *H04N 21/422* | (2011.01) |
| *H04N 21/44* | (2011.01) |
| *H04N 21/482* | (2011.01) |
| *H04N 21/81* | (2011.01) |
| *B60K 35/28* | (2024.01) |

(52) U.S. Cl.
CPC ....... *H04N 21/41422* (2013.01); *B60K 35/29* (2024.01); *H04N 21/4126* (2013.01); *H04N 21/422* (2013.01); *H04N 21/44004* (2013.01); *H04N 21/4825* (2013.01); *H04N 21/8126* (2013.01); *B60K 35/28* (2024.01); *B60K 2360/16* (2024.01); *B60K 2360/195* (2024.01)

(58) Field of Classification Search
None
See application file for complete search history.

(56) References Cited

U.S. PATENT DOCUMENTS

| | | | |
|---|---|---|---|
| 7,856,602 | B2 | 12/2010 | Armstrong |
| 8,762,879 | B1 | 6/2014 | Goodger et al. |
| 8,874,144 | B1 | 10/2014 | Liu et al. |
| 9,335,891 | B2 | 5/2016 | Paushkina et al. |
| 9,928,022 | B2 | 3/2018 | Cansino et al. |
| 9,939,989 | B2 | 4/2018 | Hwangbo et al. |
| 2003/0055537 | A1 | 3/2003 | Odinak et al. |
| 2005/0046630 | A1 | 3/2005 | Jacob et al. |
| 2005/0125736 | A1 | 6/2005 | Ferri et al. |
| 2006/0123353 | A1 | 6/2006 | Matthews et al. |
| 2006/0155429 | A1 | 7/2006 | Boone et al. |
| 2007/0120697 | A1 | 5/2007 | Ayoub et al. |
| 2007/0157240 | A1 | 7/2007 | Walker |
| 2008/0189645 | A1 | 8/2008 | Kapanen et al. |
| 2008/0301732 | A1 | 12/2008 | Archer et al. |
| 2010/0157989 | A1 | 6/2010 | Krzyzanowski et al. |
| 2011/0145863 | A1 | 6/2011 | Alsina et al. |
| 2013/0311340 | A1 | 11/2013 | Krishnan |

(Continued)

*Primary Examiner* — Idowu O Osifade
(74) *Attorney, Agent, or Firm* — HG LAW LLP

(57) ABSTRACT

Systems and methods are disclosed herein for providing in-vehicle content. Audio of media content is provided to a vehicle. The vehicle is determined to be approaching a location for stopping. A predicted stop duration is calculated during which the vehicle will be stopped at the location. A playlist of video portions of the media content is generated based on the predicted stop duration. The vehicle is detected to have stopped at the location. The video portions are generated for displaying while the vehicle is stopped at the location.

20 Claims, 9 Drawing Sheets

300 ⟍

(56) References Cited

U.S. PATENT DOCUMENTS

| | | | |
|---|---|---|---|
| 2014/0164963 A1 | 6/2014 | Klemenz et al. | |
| 2014/0309870 A1 | 10/2014 | Ricci et al. | |
| 2015/0026708 A1 | 1/2015 | Ahmed et al. | |
| 2016/0110158 A1 | 4/2016 | Park | |
| 2016/0327399 A1 | 11/2016 | Ronnang et al. | |
| 2018/0121071 A1 | 5/2018 | Khafagy et al. | |
| 2019/0196679 A1 | 6/2019 | You et al. | |
| 2019/0243517 A1 | 8/2019 | Jung et al. | |
| 2020/0134671 A1 * | 4/2020 | Maccini | H04W 12/30 |
| 2020/0319845 A1 | 10/2020 | Shoop et al. | |

* cited by examiner

700

702

Ⓐ

704
Determine, based on the user preferences, a priority for the event in the content stream 706
Is the priority high for the user ?

No → 716
Delay display of event to another stopping point

Yes

708
Identify a location for stopping the vehicle near the current location or along the current route 710
Is the location sufficient for displaying video ?

Yes → 712
Generate for display a recommendation to stop at the location to view the event including vehicle guidance of a route to the location No → 714
Generate for display an alert indicative of the event that has occurred

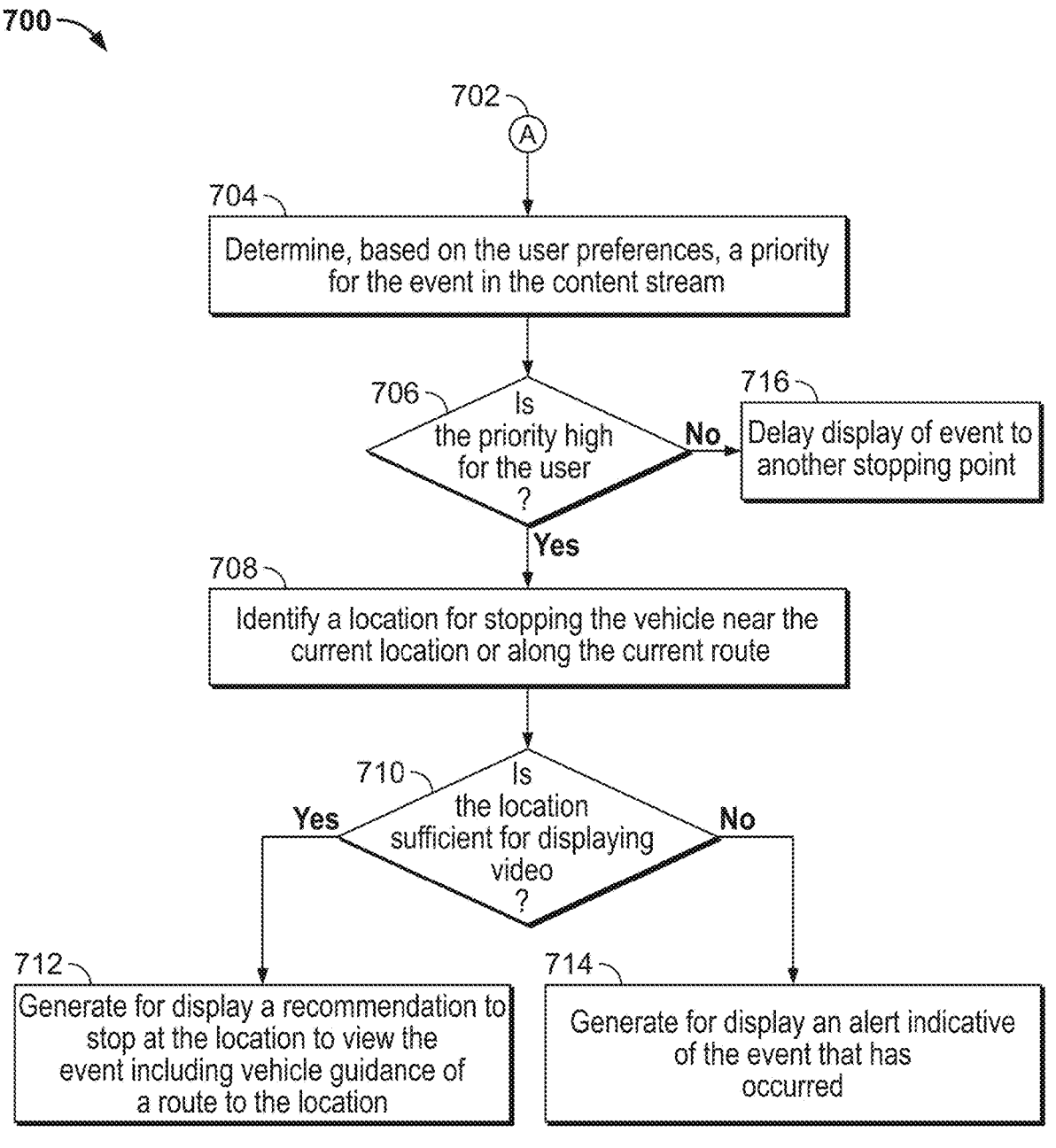

FIG. 7

SYSTEM AND METHODS FOR PROVIDING IN-VEHICLE CONTENT DURING VEHICLE OPERATION

BACKGROUND

The present disclosure is generally directed to systems and methods for providing in-vehicle content, and in particular, providing video portions of content during vehicle operation.

SUMMARY

In-vehicle entertainment systems have developed towards providing in-vehicle video content including locally stored content, cloud-based content, streaming content, and/or live video. For example, a vehicle infotainment console may be linked to a content provider and display video content on the console via either the content provider's application programming interface (API) or a third-party app. For example, while driving an automotive vehicle, the driver may want to be up to date about a live sports broadcast during the drive including catching the latest scores and highlights and/or other aspects of the ongoing game (e.g., goals, penalties, overtime, home runs, wickets, etc.). However, there are some issues in conventional systems that may ruin the consumer experience and waste system resources. Some example issues include preventing video playback during driving mode, not knowing which upcoming stops may permit viewing the video segments, splitting the user's attention between stopped traffic and the displayed video, and missing an opportunity to view a crucial event presented in streamed content.

In one approach, in-vehicle entertainment systems may allow users to connect their personal smart devices (e.g., mobile phones) to transmit the content from the smart device to the in-vehicle display. However, in this approach, the user may be distracted from operating the vehicle to select the content on the smart device (e.g., by opening the appropriate app, searching for the content stream, etc.). Some in-vehicle entertainment systems may allow display of video content after the vehicle interrupts the current route and the driver searches for a safe parking location to view the content. In such approaches, the content may be downloaded and stored for viewing after reaching a destination, and the user has an opportunity to access the stored content, which may be after the content stream has concluded. These and other approaches may involve situations that are frustrating and/or cumbersome for the user, ruining the in-vehicle entertainment experience. Further, system resources (e.g., processing time, memory) may be wasted in the process, for example, due to storing content segments of events that are not of interest to the user and occupying memory.

Thus, there is a need for an improved in-vehicle entertainment system for providing in-vehicle content during operation of the vehicle.

One or more disclosed embodiments enable an automotive entertainment system to provide in-vehicle content (e.g., video of streaming sports events). In particular, systems and methods are presented for an automotive entertainment system for providing in-vehicle video content at opportune times while the user is operating a vehicle or would otherwise be unable to view in-vehicle video content in other approaches. To overcome the aforementioned issues and unsatisfactory aspects of other approaches for in-vehicle entertainment systems, the systems and methods described herein may include adjusting the content delivery and/or consumption mode for in-vehicle content. In some aspects, a content engine for providing in-vehicle content is described herein.

As described, the content engine for providing in-vehicle content may include hardware, software, firmware, and/or any combinations of components thereof, where any of the involved systems may perform one or more of actions of the described techniques without departing from the teachings of the present disclosure. In one embodiment, the content engine determines the nature of content to be provided at or within a vehicle. For example, the content engine may determine whether visual components (e.g., video or image) should be provided, whether audio components should be provided, or whether some combination of visual and audio components should be provided. Some non-limiting examples are described as follows. For example, a content engine may include a locally hosted application at the on-board vehicle systems. For example, a content engine may include a remote application hosted at a server communicatively coupled with the vehicle systems, where the content engine provides instructions that are transmitted to the on-board vehicle systems and executed by the relevant subsystems at the vehicle. For example, a content engine may include a subsystem integrated with the on-board vehicle systems. For example, a content engine may include a local application at the on-board vehicle systems and a remote system communicatively coupled therewith.

One or more disclosed techniques enable a system to automatically and selectively provide audio, video, or both audio and video content based on a state (e.g., current or anticipated) of a vehicle. Specifically, for content having a video component, the system might provide only an audio component while the vehicle is moving, while also playing video when the vehicle is stopped. The video and audio components may correspond to the same media stream, the same underlying event (e.g., concert, sports event, etc.), or the same underlying show or program. In some aspects, the disclosed systems address the fact that a significant number of drivers sometimes consume video content while driving. This dangerous practice distracts the driver, resulting in impaired situational awareness and reaction time. For context, recent studies have found that texting while driving is six times more dangerous than driving drunk. Few would argue that driving while consuming video content is more dangerous than texting while driving. One or more disclosed systems or techniques may be implemented to address—in a safe manner—the driver's underlying desire to follow an event, such as a sports event, while driving. By automatically and seamlessly switching between video and non-video playback in some examples, some of the disclosed systems enable the driver to easily follow an event or program in a safe way (e.g., audio-only mode while the vehicle is moving), while allowing him or her to indulge in video as soon as certain criteria are indicative of being safe to do so (e.g., when the vehicle is stopped).

When a stop is detected, one or more disclosed systems may provide the video component of the content. For example, a user might listen to an audio feed for a baseball game while driving. When the vehicle stops, an infotainment system may provide video for the baseball game as well. The video might be the current livestream. In some instances, the video content might include a playlist of video highlights for events that already occurred (e.g., hits, scores, notable defensive plays, etc.). The nature of the video component may be determined based on an expected duration of the vehicle's stop. For example, the expected duration may inform whether to provide live content or highlights and/or may inform how many highlights to provide, which highlights to provide, etc.

In some instances, the system may notify the user about anticipated events (e.g., resumption of play after halftime for live content; unplayed highlights remaining in the playlist, etc.). If desired, one or more disclosed systems may prompt the user regarding recommended locations to stop and continue watching. In some examples, the system may indicate to the user a watch-time for the recommendations.

In some embodiments, the content engine may provide audio of in-vehicle content while the vehicle or infotainment system is in driving mode. The content engine may automatically display video of the content after satisfying suitable criteria for displaying video. In some embodiments, the content engine detects that the vehicle is approaching a stop location such as a traffic signal and calculates (e.g., in response to detecting the approach) a predicted stop duration during which the vehicle will be stopped at the location. In some instances, the content engine may generate a playlist of video portions depicting selected events in the content based on the user's preferences. The video portions may be selected and/or modified to ensure that the playlist's duration, or a portion thereof, fits within the expected stop duration. The content engine may delay one or more of the video portions to another location for stopping. The content engine may generate for display the video portions from the playlist at any point. The content engine may cause video of the content to be displayed (e.g., on the in-vehicle screen) while the vehicle is stopped at the location. In some embodiments, the content engine may determine that the expected stop duration is sufficiently long for consuming video and, in response, may automatically provide video of the content when the vehicle is at the location.

As an illustrative example, a driver of a vehicle may be listening to in-vehicle audio including play-by-play of an ongoing soccer game. The in-vehicle audio may be provided via the driver's smartphone linked to the in-vehicle systems or using the vehicle infotainment system. The content engine may detect and mark various events and content (e.g., streams, portions, segments, etc.) corresponding to the marked events in the soccer game based on the driver's consumption profile (e.g., goals, penalties, mentions of a specific player, etc.). The content engine may detect a traffic light approaching via the vehicle sensors and that the traffic light is indicating the traffic to stop. Sticking with the illustrative example, the content engine calculates that the vehicle will be stopped at the traffic light for 60 seconds and generates a video playlist of marked or selected events, where the total duration does not exceed 60 seconds. The content engine may generate for display the videos of the playlist before the vehicle stops, near the stop, and/or as the vehicle stops. While the vehicle is stopped at the location, the video may be displayed via the in-vehicle console or another device capable of displaying the video.

In some embodiments, the content engine may generate an overlay comprising the video display and one or more timers. For example, the timer may indicate the remaining stop duration, the remaining play duration of the displayed video, and/or the remaining total duration of the playlist. In some embodiments, the overlay may comprise a countdown indicator (e.g., the remaining time in seconds or a suitable timer icon) and/or real-time video of the surroundings outside the vehicle. The real-time video may include an indicator or signal of the stop duration. For example, if the vehicle is stopped at a traffic light, the overlay may display video of the traffic light indicating a stop. As the timer reaches zero or the traffic light signals to proceed, the content engine may alert the user, switch to an audio-only mode for the content and/or instruct the in-vehicle systems to resume driving mode. In some embodiments, the content engine may determine that the vehicle is moving and switch to audio-only during driving mode. Any interrupted or unwatched video portions may be delayed to another stop.

In some embodiments, the content engine may identify a plurality of stops along a route or other instances when the vehicle is idling or predicted to idle. The content engine may determine a destination (e.g., using map data or travel history) and identify a route for the vehicle to reach the destination. The route may be predetermined or the content engine may determine the vehicle's route. The content engine may determine predicted stop durations and/or other traffic criteria at each stop. Based on the route and map data, the content engine predicts arrival times when the vehicle will reach the respective stops (e.g., an upcoming traffic junction, a stop sign, etc.). The content engine may determine various attributes of the stops including the average wait time and usual traffic circumstances around the predicted arrival time. The content engine may determine that the vehicle will be idle at one or more of the stops for a sufficient duration (e.g., greater than a predetermined threshold or greater than a playlist duration). In some embodiments, the content engine may access a database (e.g., via a remote server) and determine the attributes at each stop based on the relevant traffic data from the database. The traffic data may include data at various traffic levels including highway and street levels depending on the route of the vehicle. In some embodiments, the content engine may interface with another application (e.g., via a mapping or navigation API) to determine the attributes of the traffic at the identified stops.

The content engine may prepare a playlist including video highlights of particular events (e.g., wicket, home run, goal, missed penalty, etc.) from the in-vehicle content for playing at each stop. In some embodiments, events or segments of a content item may be associated with a quantity (e.g., score, level, degree, etc.) indicative of an interest, importance, and/or priority to a user based on user preferences. The events or segments may be evaluated and ranked in this manner. The video highlights may be selected for the playlist based on the ranking of the events. Additionally, or alternatively, the playlist may be chronologically ordered by occurrence of events in the in-vehicle content. In some embodiments, the content engine generates and updates a playlist queuing content portions or segments. For example, the playlist may comprise particular events of a livestream as and when the events occur. The playlist may be adjusted such that the duration and times of the segments are suitable for playing within the stop durations of the vehicle while en route. For example, at any time while the vehicle is en route, the content engine may update a predicted arrival time and stop duration for the vehicle corresponding to an upcoming traffic junction.

The content engine may generate and/or continuously update a playlist of video portions from the media content. For example, the content engine may determine a content stream of interest to a user in the vehicle such as a livestream of a soccer game. The content engine may determine if the user is interested in the soccer game based on user preferences, a user profile, or other user information. The content engine may detect events as they occur in the soccer game, compare the events to the user information and update a playlist for the soccer game. The playlist may be used to provide in-vehicle video at stopping points for the vehicle.

The content engine may determine that an event in ongoing content has occurred or is approaching and that the user may prefer to view video depicting the event. In some embodiments, the content engine may determine that the traffic circumstances of the vehicle satisfy a set of criteria for displaying video content (e.g., slow speed, steady pace, vehicle spacing, etc.). For example, the content engine may determine that the vehicle is moving sufficiently slowly in traffic. Based on the slow movement of the vehicle and if traffic near to the vehicle is moving sufficiently slowly (e.g., due to traffic congestion), the content engine may instruct the in-vehicle systems to maintain a particular distance between the vehicle and the nearest vehicles within a proximity. While the vehicle is safely proceeding at a sufficiently slow pace, the content engine may start playing the video of the content via the in-vehicle entertainment systems to enhance the on-board consumer's entertainment experience.

In some embodiments, the content engine may identify a suitable location for the vehicle to stop and/or guide the vehicle to the location. The content engine may determine a location that is proximate to the current route of the vehicle. For example, the content engine may query for nearby parking lots or side streets using a navigation API. The content engine may generate an alert or notification indicating the selected event in the content and update the current route to include the new location. In some embodiments, the content engine may generate a recommendation to park and view the video content via the in-vehicle screen, the recommendation comprising directions to the location. The content engine may guide the vehicle to the identified location and, upon stopping at the location, display the content. Once viewed or after the vehicle starts moving towards the route, the content engine may resume regular operation.

As a result of the described systems and techniques, a device in a vehicle (e.g., an in-vehicle entertainment system) may provide in-vehicle content in an efficient and safe manner. In particular, the content engine described herein may determine the appropriate locations and times during vehicle operation at which a user may safely view video of in-vehicle content (e.g., to stay updated about ongoing sports events and the like). Rather than preventing video during driving mode during such periods, for example, the content engine can automatically switch from an audio-only mode, enabling in-vehicle display of video when the vehicle can be idle for a sufficient duration. Further, the content engine can generate a video playlist of the selected events for viewing within the stop duration. The content engine improves upon conventional systems and reduces wasted system resources by retrieving video content for the user for particular events and adjusting the playback duration to fit within the idle or "safe" duration. Moreover, the content engine temporarily stores the video segments during the vehicle operation and plays the video segments at the predicted suitable stops. Allowing particular segments to be consumed at opportune times during the vehicle operation frees up memory that would be otherwise reserved (e.g., stored segments that are postponed until the user finishes operating the vehicle). Thus, the content engine of the present disclosure addresses the aforementioned issues and other unsatisfactory aspects in conventional in-vehicle entertainment systems.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 7 is a flowchart of a process for providing guidance to view video content of an event, in accordance with some embodiments of this disclosure;

DETAILED DESCRIPTION

As referred to herein, the term "media content" or "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof.

Figure 1:
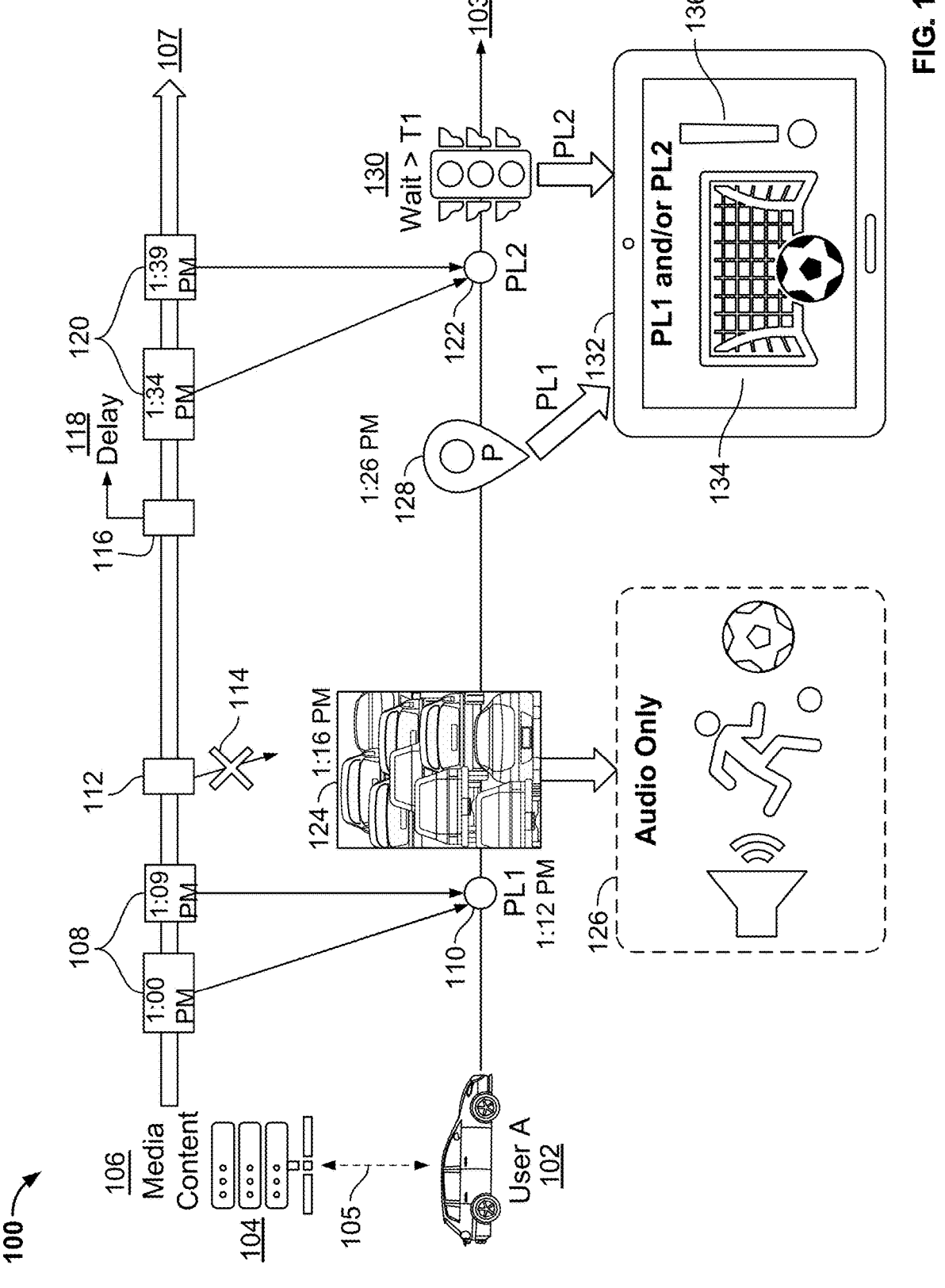
FIG. 1 shows an exemplary scenario of a content engine providing in-vehicle content, in accordance with some embodiments of this disclosure.
Figure 8:
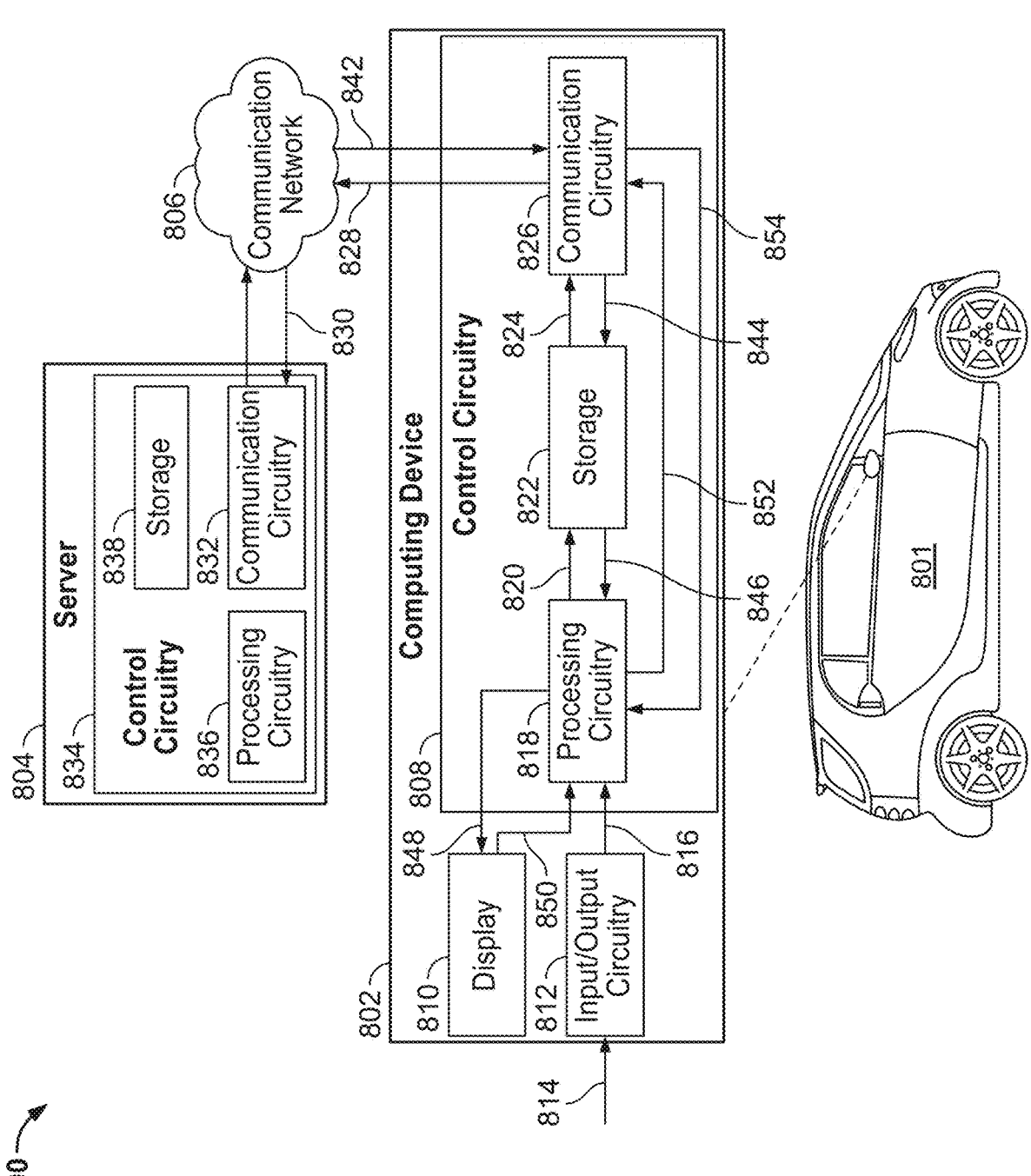
FIG. 8 is a block diagram of an exemplary system for providing in-vehicle content, in accordance with some embodiments of this disclosure.
Figure 9:
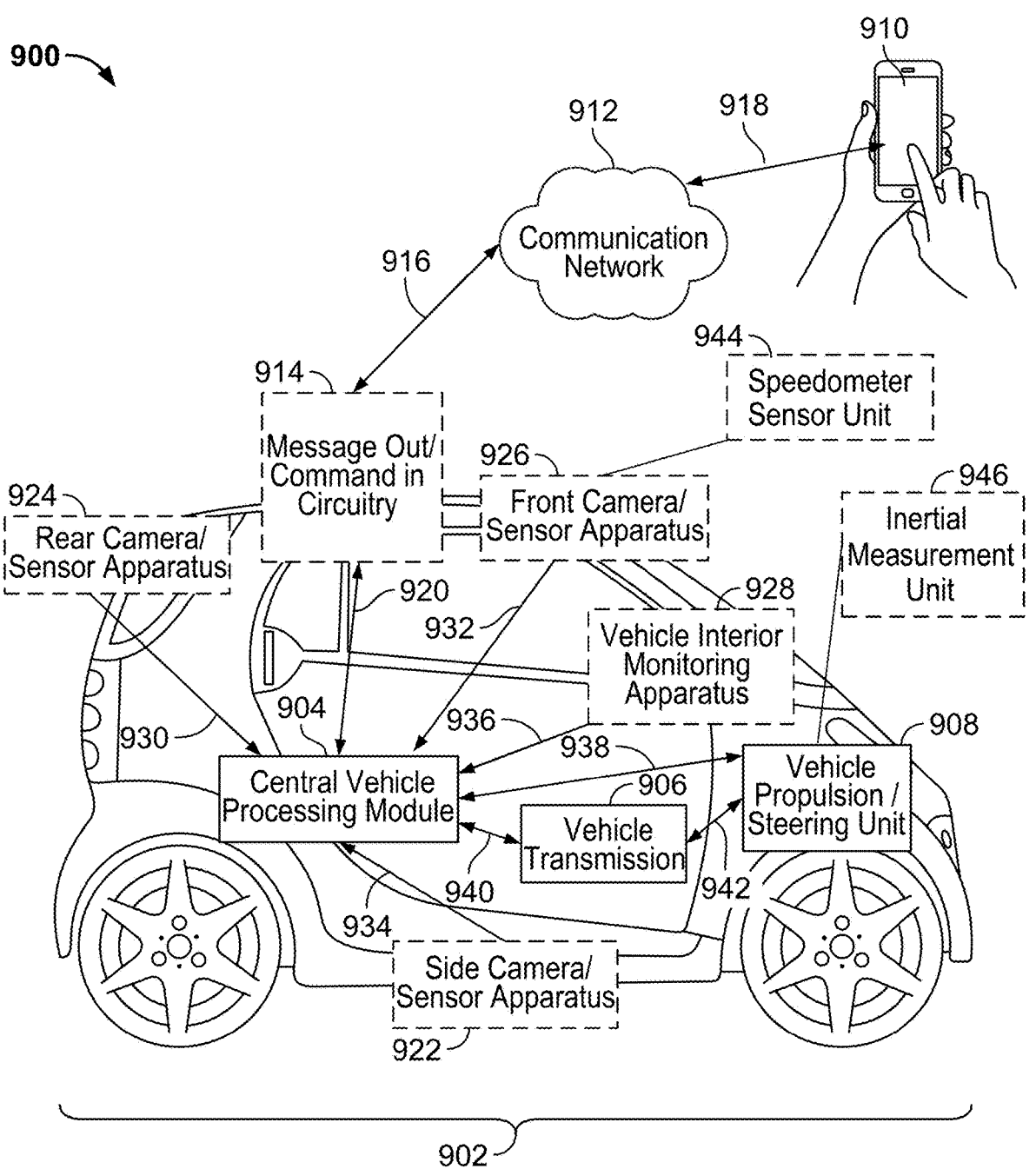
FIG. 9 depicts a vehicle system including example components for providing in-vehicle content, in accordance with some embodiments of this disclosure.

As described regarding FIGS. 8-9, the disclosed systems (e.g., including a content engine, such as the example content engine 104 shown in FIG. 1; in-vehicle systems; etc.) and/or techniques may involve some or all components of systems 800, 900 (e.g., computing device 802, server 804, communication network 806, central processing module 904, message in/command out circuitry 914, etc.). For example, vehicle system 900 may be included in any or all of vehicles 102, 204, 206, and/or 801. For example, some or all parts of system 800 may be integrated with vehicle system 900 and/or any other system described herein. For example, vehicle system 900 may be all or partially separate from system 800, but some or all components of vehicle system 900 may be operating in conjunction with some or all components of system 800. For example, communication network 806 may communicatively couple computing device 802 and server 804. For example, a content engine which may include or be implemented by way of device 802 and/or module 904, may determine a predicted stop duration. For example, a content engine, which may be implemented by way of or be part of module 904 or device 910 may be generating a playlist as described herein. In some cloud-based configurations where a playlist is generated remotely (e.g., remote relative to the device that ultimately plays back content included in the playlist), the playlist may be transmitted via communication network 806, 912 to system 900 (e.g., via circuitry 914). Messages, instructions, and the like may be passed between any components of the disclosed systems. Some example configurations of the messaging and associated protocol are described regarding FIG. 9.

In particular, one or more disclosed systems may include all or some components and/or associated circuitries of FIG. 8, for example, as described regarding FIGS. 1-4. One or more disclosed techniques may be implemented via all or some components and associated circuitries of FIG. 8 for executing one or more steps of the processes, for example, as described regarding FIGS. 5-7. For example, a content engine may selectively provide an audio component via input/output circuitry 812 and/or a video component at display 810. For example, one or more of apparatuses 922, 924, 926, 928 may be involved in collecting vehicle telemetry data and nearby traffic information and/or analyzing the data to detect if the vehicle is slowing, stopping, etc. Based, at least in part, on such data or determinations, one or more disclosed systems or components (e.g., the systems 800 or 900) may determine that the vehicle (e.g., the vehicle having the body 902 or any one or more of the vehicles 102, 204, 206, or 801) is approaching a location for a stop. As an illustrative example, a content engine may include a computing device 802 having, for example, control circuitry 808, display 810, and input/output circuitry 812. In an example implementation, a content engine, via processing circuitry 818, may determine appropriate locations and times during vehicle operation at which a user may safely view video of in-vehicle content. In an example implementation, a content engine, via communication circuitry 826, may access a data source (e.g., server 804, a database using communication network 806, etc.) to access and/or retrieve data for determining these opportune locations and times. In some example configurations, a content engine including all or some of system 800 may be communicatively coupled with one or more content databases (e.g., storing media content and/or playlists that are delivered to the disclosed vehicles, in-vehicle systems, or mobile devices at which some or all of the media content is played back; not shown) via communication network 806. For example, the content engine may access a remote content source, provider, etc. via communication networks 806 and/or 826. For example, the content engine may access content from a device in vehicle 801 via communication networks 806 and/or 826. It is contemplated that there are various configurations to implement the disclosed systems and techniques using the components and/or circuitries. It is noted and appreciated that the following description and provided examples are intended to be non-limiting and may involve various parts of FIG. 8 and combinations thereof without departing from the teachings of the present disclosure.

FIG. 1 shows an exemplary scenario 100 of the content engine providing in-vehicle content, in accordance with some embodiments of this disclosure. As illustrated in FIG. 1, a content engine 104 provides in-vehicle content via path 105 (e.g., which may include communication networks, links, or paths such as any one or more of the paths 820-848 shown in FIG. 8) from media content 106 to vehicle 102 (e.g., at display 132, which may be the same or similar to the display 810). Scenario 100 illustrates the relationship between the actions of the content engine 104 and the progression in media content 106. While vehicle 102, content engine 104, and media content 106 are shown separately in FIG. 1 for illustrative purposes, scenario 100 and the examples described herein are intended to be non-limiting. As a first example of scenario 100, media content 106 may be stored (e.g., storage 822) and played at the systems in vehicle 102 (e.g., via display 810). In a second example of scenario 100, media content 106 may be provided (e.g., streamed) via a remote server (e.g., server 804) coupled to the systems in vehicle 102 (e.g., via communication circuitries 826, 832 and/or communication network 806). In a third example of scenario 100, media content 106 may be provided to the content engine 104 (e.g., via communication circuitry 826), and the content engine 104 may subsequently prepare the content (e.g., via control circuitry 808) for presenting at vehicle 102 (e.g., via display 810 and/or associated display circuitry). For example, the media content 106 may be downloaded and stored for later retrieval and play-back. As described below, depending on the embodiment, the content engine 104 may be implemented by any suitable combination of devices or hardware (e.g., a host device for a server, a mobile device in the vehicle 102, an infotainment system in the vehicle 102, or some combination thereof). In an embodiment, the content engine 104 is implemented by a device including an in-vehicle display 132. In an embodiment, the content engine 104 is implemented by a device distinct from the device including the in-vehicle display 132.

Media content 106 may comprise visual (e.g., video or image) and audio content (e.g., a news report, a movie, a football match, a soccer game, etc.). For example, media content 106 may comprise a live content stream, content stored at a cloud-based storage, locally stored content, and/or combinations thereof (e.g., including some cloud-based content and some locally stored content).

As a non-limiting example, media content 106 may be about a livestreamed soccer game. To further illustrate this example referring to FIG. 1, content engine 104 may be providing the livestream in an audio-only mode to a first device at vehicle 102. For example, the livestream started around 12:45 PM. Content portions 108 may depict first and second attempts for a team to score a goal played in the livestream at the first and second time periods indicated on timeline 107. For example, the first attempt is shown between 1:00-1:06 PM and the second attempt is shown between 1:09-1:12 PM. The content engine 104 may mark content portions 108 for adding to a playlist as each goal attempt occurs in the livestream (e.g., based on matching to a preferred event type). The content engine 104 generates a playlist 110 including the marked content portions 108 at the time indicated on timeline 103. For example, the playlist 110 is generated at 1:12 PM. Concurrently, the content engine 104 may prepare for displaying the video of marked content portions 108 (e.g., decode, decompress, buffer in local memory, etc.). In this example, at or around 1:12 PM, the content engine 104 may detect that vehicle 102 is approaching location 124. For example, the approach to location 124 is detected at 1:12 PM and vehicle 102 stops at 1:16 PM. The content engine 104 may determine that location 124 and/or near to location 124 has heavy traffic congestion. The content engine 104 may determine an expected idle time based on the traffic congestion. The content engine 104 may determine that the expected idle time indicates that vehicle 102 would not stop long enough to permit display of video. In response, the content engine 104 continues playing the livestream in the audio-only mode and maintains playlist 110 and the prepared video for playing at another opportunity. Content engine 104 may determine to play playlist 110 at location 128 in a similar manner. Vehicle 102 may arrive and stop at location 128 at the time indicated on timeline 103. For example, vehicle 102 stops at location 128 at 1:26 PM. The content engine 104 may determine that vehicle 102 is stopped long enough to display video and causes the prepared video to be displayed at the first device or another device at vehicle 102 (e.g., by playing the buffered video). In this example, the livestream may continue playing on timeline 107, presenting the content portions (e.g., content portions 120) at the times indicated on timeline 107 (e.g., respectively around 1:34 PM and 1:39 PM) in parallel with the aforementioned actions and other actions by content engine 104. It should be understood that the indicated times are exemplary and other times would be suitable for scenario 100. Additional examples following scenario 100 are described with respect to FIG. 1 in the following paragraphs.

Timeline 103 illustrates an example chronology of example times at which content manipulation actions take place, with reference to media content 106, at or near the vehicle 102 and/or the in-vehicle systems of vehicle 102 Example content manipulation actions may include some example actions that may be performed by the content engine (e.g., continuously, based on matching one or more criteria, in response to particular triggers, etc.). Timeline 103 indicates some points at which the content engine 104 may execute the example actions (e.g., playlist generation) based on the determinations and the like described herein. Some example situations are illustrated to provide context for the actions described herein and are intended to be non-limiting.

Timeline 107 illustrates an example chronology of example playback times for content portions of the media content 106. Media content 106 may include content portions 108, 112, 116, and 120. The content portions 108-120 may depict or represent events (e.g., concert starting, goal scores, half-time beginning, etc.) occurring in the media content 106. In particular, the content portions 108, 112, 116, and 120 may comprise audio and/or video content associated with the events. The content engine 104 may determine that one or more of the content portions depict or represent events to be presented at vehicle 102. For example, if the media content 106 comprises livestreamed content, one or more of the content portions may depict events that occur in parallel to timeline 103. Content portions 108, 112, 116, and 120 may have varying play durations as illustrated in FIG. 1.

Content engine 104 may be providing audio of media content 106 to the interior of vehicle 102. For example, a mobile device disposed inside vehicle 102, or a vehicle infotainment system may be playing the audio. Content engine 104 may detect occurrence of events in content portions 108 in media content 106. Content engine 104 may queue video of content portions 108 to a first playlist 110 (labeled PL1 in FIG. 1) for providing to vehicle 102. Content engine 104 may detect events in content portions 120 in media content 106 and queue video of content portions 120 to a second playlist 122 (labeled PL2 in FIG. 1).

The content engine 104 may determine whether circumstances for vehicle 102 satisfy one or more criteria for concluding that the vehicle has stopped at a location sufficient to enable or allow playback of video content of an event (e.g., provided as a content portion or queued as part of a playlist). Some example criteria include the speed of the vehicle, the spacing between vehicles, the average traffic speed around the vehicle, a zone type such as a construction zone, time of day (e.g., rush hour), a vehicle speed range, a minimum spacing between neighboring vehicles, above normal traffic congestion, etc. The content engine 104 may evaluate the criteria continuously or in response to detecting occurrence of one or more event types in media content 106. As an illustrative example, the content engine 104 may determine if the criteria at location 124 are satisfied to display video from PL1 such as content portions 108. In some embodiments, the content engine 104 may determine whether a first criterion is satisfied, which may lead to the content engine 104 determining and evaluating criteria following from the first criterion. For example, content engine 104 may determine that the vehicle is moving in traffic at location 124 as a first criterion. Continuing the example, content engine 104 may continue the determination based on subsequent criteria such as the vehicle speed range and/or average traffic spacing. The content engine may determine that vehicle 102 is moving above a safe speed level (e.g., over 7 mph) or that the traffic spacing is fluctuating in proximity to vehicle 102 beyond specified limits, which do not satisfy the subsequent criteria. Under such circumstances, content engine 104 may determine to provide and/or continue providing audio 126 of media content 106. Playlist 110 may be postponed to another location on timeline 103 that satisfy the criteria for displaying video. As another example, content engine 104 may determine that, at location 124, vehicle 102 is moving at a slow, steady pace or other suitable speed range, which may satisfy the criteria. In such an instance upon determining that the criteria are satisfied, content engine 104 may instruct the on-board vehicle systems to maintain a distance between nearby vehicles and start playing video from playlist 110 while vehicle 102 maintains about the same pace.

In some embodiments, content engine 104 may search and identify a second location in response to determining that video should not be played at a first location (e.g., location 124). As an illustrative example, content engine 104 may identify a location 128. For example, the content engine 104 may identify the location 128 based on the fact that the location 128 is near a stop or a point where vehicle 102 is predicted to park or is otherwise idle for a period of time. Content engine 104 may determine that circumstances at or near location 128 satisfy the criteria for playing video from playlist 110. For example, content engine 104 may determine that vehicle 102 will arrive at location 128 in 60 seconds and stop at location 128 for 35 seconds. Content engine 104 may determine that playlist 110 has a duration of 32 seconds and that the playlist duration fits within the predicted stop duration for location 128. It is contemplated that there are various methods for the content engine 104 to determine location 128 including those described herein without departing from the teachings of the present disclosure. Regardless of how the location 128 is determined, when vehicle 102 reaches location 128, content engine 104 may automatically display the video portions from playlist 110 at the in-vehicle display 132. For example, display 132 may show a video 134 of a goal-scoring event. In a similar manner, content engine 104 may determine a location 130 for playing video of playlist 122 where the predicted stop duration is greater than a threshold duration. For example, location 130 may be proximate to a traffic light, and the predicted stop duration may be greater than the duration of playlist 122. Content engine 104 may generate for display the video from playlist 122 on display 132.

Media content 106 may include and/or may be associated with metadata. Metadata associated with media content may indicate events (e.g., having event IDs), event types (e.g., sports highlight, breaking news, etc.), time stamps, time periods indicating the lengths of events, event priority, etc. For example, if media content 106 is about a cricket game, the content provider of media content 106 may provide metadata that indicates a highlighted event in the game. The metadata may indicate that content portions 108 are associated with the highlighted event. In some embodiments, content engine 104 may determine that the metadata indicates the highlighted event and mark the associated content portion. Additionally, or alternatively, content engine 104 may identify an event and associated content portion based on content information and user information (e.g., user preferences).

As an illustrative example, the content engine 104 may retrieve metadata of media content 106 and/or user information. The content engine 104 may access the user information such as a user profile comprising the consumption preferences from memory (e.g., storage 822 and/or storage 838 in FIG. 8). In particular, the content engine 104 may generate, access, retrieve, and/or update user/vehicle/content data including user preferences stored in memory (e.g., local, cloud-based, remote, and/or combinations thereof). Some examples of accessible data include content (e.g., video and audio portions), vehicle status information and associated factors, vehicle/user event information, media/content event information and associated factors, predicted stop duration, etc. Continuing the example, the content engine 104 may identify an event from metadata. The content engine 104 may determine the identified event matches a consumption preference from the user information. The content engine 104 may determine, based on the metadata, that the content portions 108 are associated with the identified event. The content engine 104, based on the metadata and the user information, may identify and/or mark content portions 108.

In some embodiments, content engine 104 may determine a priority or importance level for an event based on content information and/or user information. For example, the content engine 104 may access a user's consumption preferences and determine what types of events are indicated as high priority and/or have a high priority level. The content engine 104 may determine that content portions 108 include events matching a high priority event type. For example, content portions 108 may include events that affect the sports event outcome for a preferred team. The events may have an event type (e.g., game changer, preferred team, etc.). Based on matching the event type, content engine 104 may designate content portions 108 as high priority and/or assign a high priority level. In some embodiments, content engine 104 may generate a high-priority indicator for concurrent display with display of high priority content portions. For example, the user profile may be from a sports events application. Content engine 104 may access the user profile via an API corresponding to the sports events application and retrieve user preferences indicating the high-priority event types such as a goal-scoring event type. Based on the user preferences, content engine 104 may determine that content portions 108 include an event where a team scored a goal, which matches a high-priority event type. Content engine 104 may generate for display an alert and/or icon along with display of content portions 108 to indicate that the event has a high priority event type. For example, content engine 104 may determine that the goal-scoring event belongs to a high priority event type from the user information and generates for display icon 136. Icon 136 may be concurrently displayed with video 134. In this manner, content engine 104 notifies the driver that video 134 belongs to a high-priority event type.

Content engine 104 may detect that content portion 112 includes an event and determine, based on the event, that content portion 112 should not be added to a playlist. Content engine 104 may mark content portion 112 to not be added to a playlist. For example, content portion 112 may be a commentary event about the soccer game or players passing between each other. A commentary event may not have an event type that matches a user preference. The content engine 104 may indicate to not queue content portion 112 by adding a flag or other marker 114, for example, stored in metadata associated with content portion 112. Based on the marker 114, the content engine may prevent content portion 112 from being stored or retrieved for presentation at vehicle 102.

Content engine 104 may detect content portion 116 in media content 106 and determine that content portion 116 should be provided to vehicle 102 (e.g., based on content portion 116 including an event matching user preferences). The content engine 104 may determine that video of content portion 116 can be provided later, allowing for other content portions to be provided first (e.g., content portions 120). For instance, the event in content portion 116 may have an event type indicated as a low priority in the user information. In such an instance, content engine 104 may determine to postpone playing of video for content portion 116. For example, content portion 116 may include an event of a player dribbling the ball during the soccer game. While the user's profile may indicate a preference for a dribbling event type, the dribbling event type may be associated with a low importance score. Based on the event type matching a user preference and having a low importance score, content engine 104 may mark or delay presentation of content portion 116 to a later time point 118. For example, as a result from the delay, content engine 104 may add content portion 116 to a playlist for playing at time point 118.

In some embodiments, the content engine 104 may identify content portions including events in the media content 106 by determining event preferences and/or event type preferences based on user reactions in the vehicle while providing audio of the media content. The content engine 104 may select video content portions based on one or more user reactions. For example, the content engine 104 may detect one or more user reactions within the vehicle by capturing user audio and/or one or more user gestures via one or more sensors. For example, the content engine 104 may detect that a user exhibited an energetic, positive shout after a goal-scoring event. To illustrate one detection technique, the user or driver may be monitored via an in-vehicle camera system. Images of the user may be captured via the camera system. The images may be transmitted from the camera system to the content engine 104. The content engine 104 may analyze the images to identify gestures or facial expressions. The content engine 104 may classify the detected facial expressions or gestures to indicate whether they correspond to a positive reaction. In some instances, a degree of positivity may be determined, or a length of time during which a positive response was observed may be determined. These factors may be accounted for when determining whether a user has exhibited a sufficiently positive reaction. It is contemplated that there are many methods that content engine 104 may apply to detect and analyze the user reactions without departing from the teachings in the present disclosure. For example, biometric information from a wearable device may transmitted from the wearable device to the content engine 104, the system 800, or the system 900. In an example, the biometric information may be analyzed to detect user reactions or to inform a determination or detection of user reaction. Regardless of which technique is applied, content engine 104 may determine (e.g., from the image analysis) that a sufficiently positive reaction has been exhibited. Based on determining that a sufficiently positive reaction has been exhibited, the content engine 104 may select a video content portion corresponding to the goal-scoring event for playing at an opportune period.

In some embodiments, the content engine 104 is hosted at a cloud server and linked to an on-board vehicle system for providing the generated content playlist. For example, a cloud-based system may provide or deliver a content playlist of video content including identified events, highlights, etc., to the on-board vehicle infotainment console. The infotainment system may then access and play the content in order of the playlist via the vehicle's display device for the user at the corresponding traffic signals.

Regarding playlist generation and playback, the content engine 104 may prepare a playlist based on the user's preferences (e.g., based on teams the user likes, players the user follows, leagues the user follows, etc.) and based on an analysis of available content and identified events. In some embodiments, the content engine 104 may instruct a cloud-based application or a remote device to prepare the playlist based on accessing the user's profile comprising the content preferences. For example, during a livestream of a sports game, content portions corresponding to events in the sports game may be ranked according to the content preferences as and when the events occur. Continuing the example, a goal-scoring event and a defense event may occur in the livestream, the events having corresponding content portions. The content engine 104 may detect the two events when they are shown in the livestream. The content engine 104 may determine that the content preferences indicate that the defense event has a higher ranking than the goal-scoring event. For example, the user viewing history may indicate higher consumption of defense event types compared to goal-scoring events. The ranking may be included with the marked content portions, for example, by adding a rank indicator (e.g., rank 1 for the defense event and rank 2 for the goal-scoring event) and/or indicate a presentation order (e.g., play defense event first and goal-scoring event second). Based on the ranking, the content engine 104 may add the content portions and/or adjust a playlist order to have the defense event be presented before the goal-scoring event. Content portions corresponding to these events may be ranked based on the user's profile accessed by the content engine 104 or via a remote server. Relevant user data is provided for the content engine. In some embodiments, the content engine 104 via cloud-enabled functions may keep track of particular events as and when they occur in the progression of the media content. The tracking may be used to further optimize a generated playlist.

In some embodiments, the content engine 104 may determine the wait duration from a first stop to a second stop or between other instances when the vehicle is idling or predicted to idle. The content engine 104 may access traffic data including historical and current traffic data to calculate one or more stop durations. The traffic data may comprise information about traffic circumstances corresponding to a plurality of vehicle stop durations at a location. Based on the vehicle stop durations, the content engine 104 may determine an average wait time and/or other statistical metrics for a location. For example, the content engine 104 may request traffic data from a traffic database and analyze how long vehicles stopped at different locations along a route of the vehicle. The content engine 104 may determine average wait times for each idling point along the route of the vehicle based on the traffic data (e.g., at stoplights, stop signs). The traffic data may include data at various traffic levels including highway and street levels, depending on the route of the vehicle. For example, at any time while the vehicle is en route, the content engine 104 may determine an arrival time or update a predicted arrival time when the vehicle will reach the next traffic junction. The content engine 104 may determine that the wait time at the traffic junction is above a threshold (e.g., greater than 20 seconds or greater than a playlist duration).

In some embodiments, the content engine 104 may optimize the playlist playback by requesting that the playlist duration or portions thereof match with traffic wait time. In some implementations, the content segments are synchronized with each idle point (e.g., traffic light) and the synchronization instructions/information is embedded in the content playlist. The vehicle entertainment system may read the synchronization and play back the content segments accordingly. There may be some circumstances when content segments for particular events will not be presented at the first upcoming traffic signal. As an example circumstance, the expected wait time at the traffic signal may be less than the overall duration of the segments, but the expected wait time may be enough to present some of the segments queued in the playlist. As another example circumstance, the playlist includes additional segments since more events have occurred by the time the vehicle arrives at the traffic signal. In another instance, the content engine 104 may determine that none of the playlist may be presented at the traffic signal. For such circumstances, the content engine 104 may mark the unpresented segments unwatched and push them to a later time or add them to a second playlist for playing at a second location (e.g., the next upcoming idle point). For example, the content engine 104 may present the first part of the playlist (e.g., PL1 at location 128) at the traffic signal and the remaining segments may be delayed to the next opportunity (e.g., added to PL2 at location 130).

The content engine 104 may perform continuous updates and computations to further improve the in-vehicle entertainment experience. For example, the content engine 104 may calculate various attributes of the playlist and adjust delivery of the content based on how much pending content is queued to be consumed and how many content portions that include events matching the user preferences have occurred since the prior consumption period or location (e.g., at the previous traffic light). The content engine 104 may determine and continuously update an estimate of how much time is expected at each idle point (e.g., traffic lights) and the total expected idle time along the route until the destination.

Figure 2:
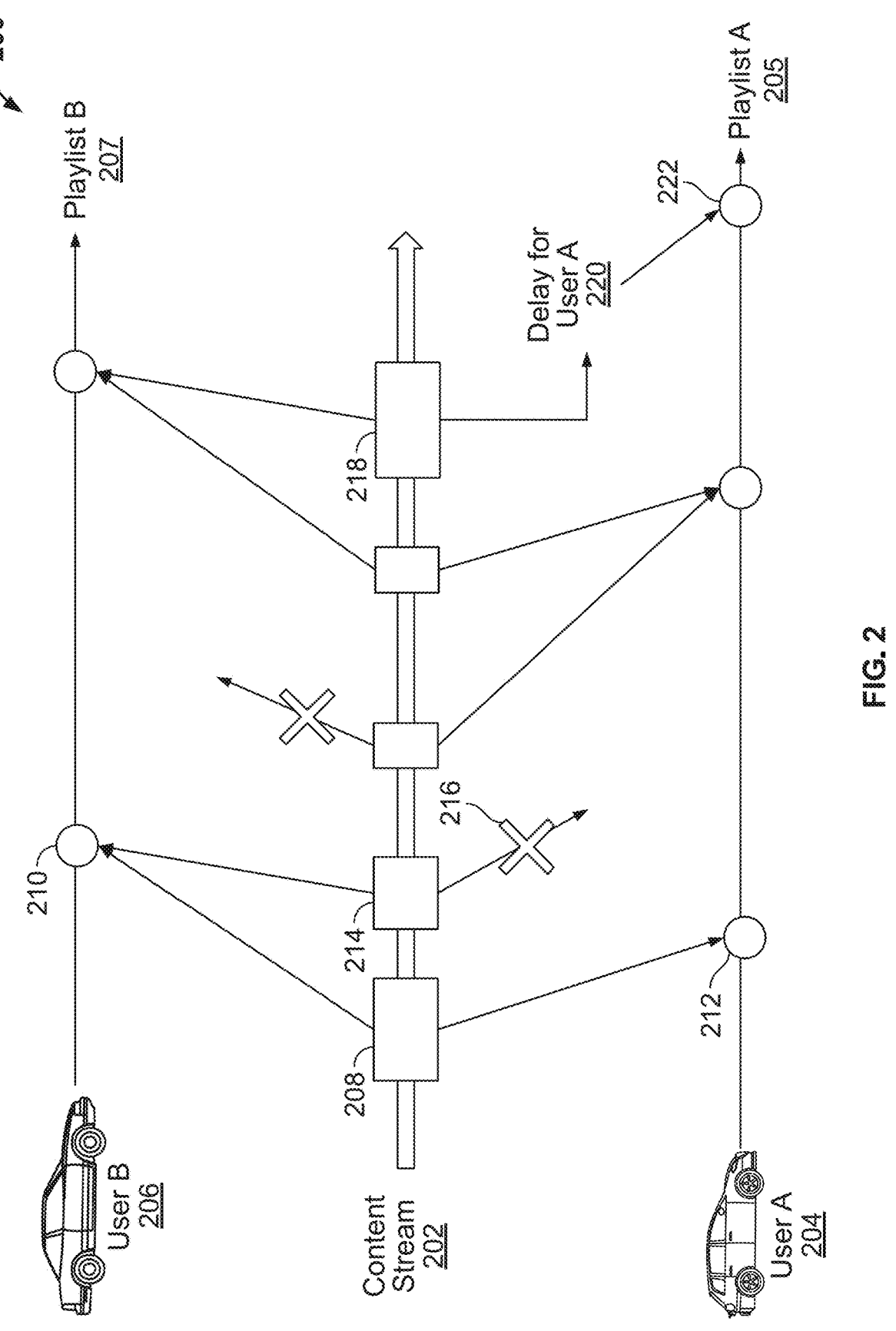
FIG. 2 shows an exemplary scenario of a content engine providing in-vehicle content to multiple vehicle systems, in accordance with some embodiments of this disclosure.

FIG. 2 shows an exemplary scenario 200 of a content engine providing in-vehicle content to multiple vehicle systems, in accordance with some embodiments of this disclosure. For example, the content engine may be content engine 104 described regarding FIG. 1. In FIG. 2, the content engine (e.g., via a cloud-based application) may be providing media content for vehicles 204 and 206. A first user may be in vehicle 204 with timeline 205, where vehicle 204 is associated with a first playlist (labeled Playlist A in FIG. 2). A second user may be in vehicle 206 with timeline 207, where vehicle 206 is associated with a second playlist (labeled Playlist B in FIG. 2). As shown in scenario 200, the media content may be a live content stream 202 progressing in parallel with timelines 205 and 207. It is noted that content stream 202 is provided as an illustrative example for the following paragraphs and any media content may be included. The content engine may detect a plurality of content portions including selected events (e.g., content portions 208, 214, 218) occurring in the content stream 202.

The content engine may determine to perform different actions while providing content stream 202 to vehicles 204 and 206, for example, based on their respective user preferences and/or respective criteria regarding the traffic circumstances. For example, the content engine may add video of content portion 208 to playlist A and playlist B. The content engine may determine that the video should be played at different times for respective vehicles. For example, point 212 may be identified as a stopping location for vehicle 204 and point 210 may be identified as a stopping location for vehicle 206, where points 210, 212 are at different times and/or locations. The content engine may detect occurrence of a selected event in content portion 214 and determine that video of content portion 214 should be added to playlist 207 for vehicle 206 and should not be added to playlist 205 for vehicle 204. For example, content portion 214 may be associated with a high importance score for the second user but not the first user, based on their respective user profiles. For example, playlist 205 may have a full queue for vehicle 204 and content portion 214 can be postponed. In a similar manner, the content engine may detect content portion 218 and determine to delay playing of the corresponding video (labeled delay 220 in FIG. 2) for vehicle 204 until an opportune point 222.

Figure 3:
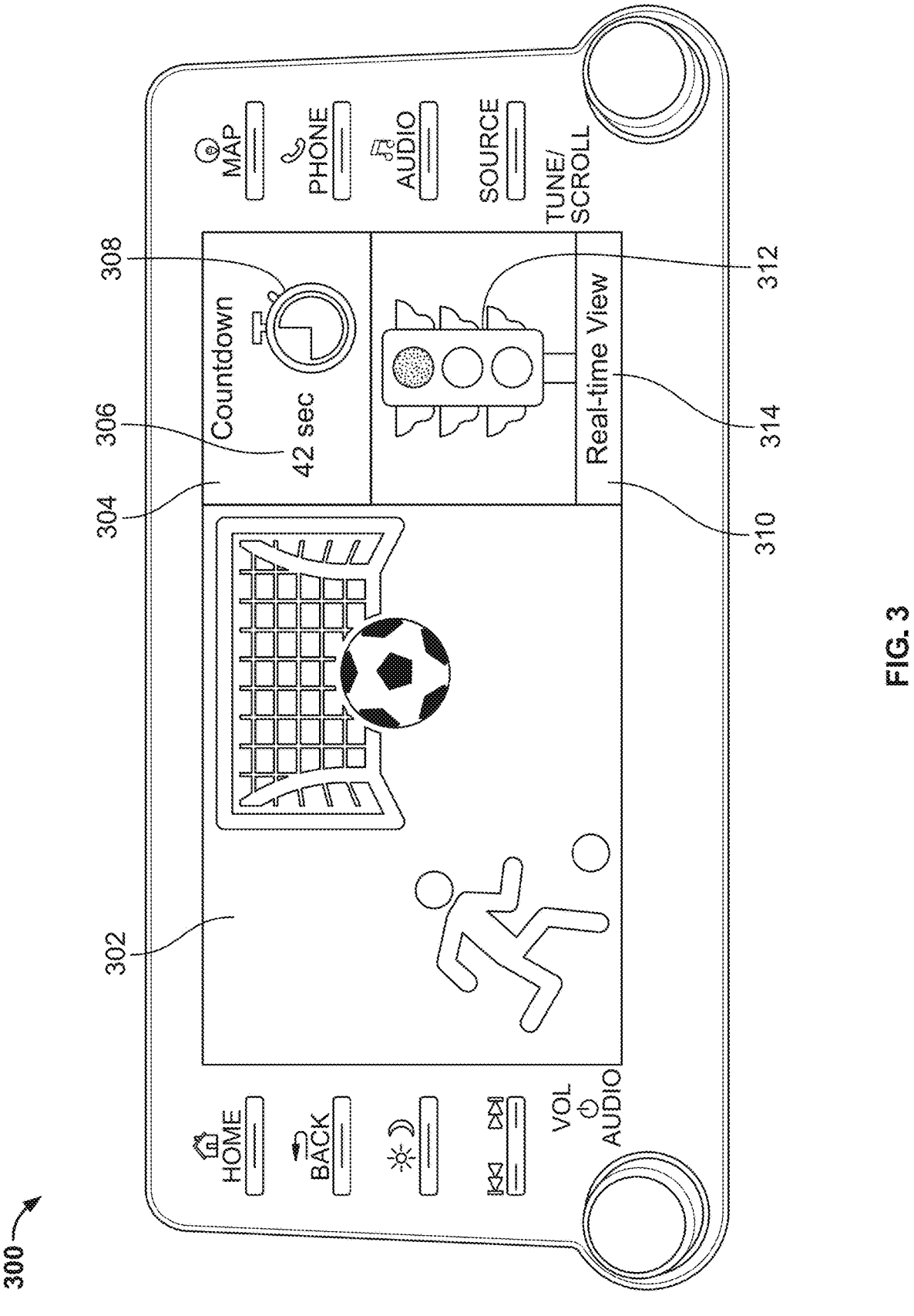
FIG. 3 shows an exemplary overlay for providing in-vehicle video content, in accordance with some embodiments of this disclosure.

FIG. 3 shows an exemplary overlay 300 for providing in-vehicle video content, in accordance with some embodiments of this disclosure. In an embodiment, the overlay 300 may be provided, in whole or in part, by the systems depicted in scenarios 100 and 200 (e.g., by the content engine 104, the display 132, or some combination thereof). Overlay 300 comprises display portions 302, 304 and 310. It is noted and appreciated that display portions 302, 304, and 310 are non-limiting examples and that overlay 300 may comprise any number of display portions. Display portion 302 may be configured to display video content of events (e.g., video depicting a player scoring a goal). For example, display portion 302 may show the video segments from a playlist generated using any of the systems and techniques described herein.

Display portions 304 and 310 may be configured to display supplemental information in a manner that does not interrupt viewing of display portion 302. For example, display portion 304 may be shown separately from display portion 302 without overlapping the display. In an embodiment, display portion 304 may be shown within the same display area as display portion 302 (e.g., using a picture-in-picture (PIP) display mode). In this embodiment, the content engine may identify a display area that does not interfere with viewing the video in display portion 302. Using a goal-scoring event as an example, the content engine may analyze the video using one or more machine vision techniques to identify an area away from the event (e.g., by identifying the athlete's position, the movement resulting in the goal, etc.). The content engine may position display portion 304 in the identified display area.

In an embodiment, the supplemental information may be related to the content displayed in display portion 302 and/or the playlist. For example, if display portion 302 shows a goal-scoring event in a soccer game, display portion 304 may indicate the teams playing in the soccer game and display portion 310 may indicate the game score. For example, display portion 310 may show the current score if the game is ongoing. For example, display portion 310 may temporarily show the score before and after the goal-scoring event and then transition to the current score for the game. As another non-limiting example, display portion 304 may include video preceding the event shown in display portion 302. In the example where display portion 302 shows a goal-scoring event, display portion 304 may show a team play leading up to the goal-scoring event. Some non-limiting examples of supplemental information related to the content and/or playlist include event information (e.g., statistics for the team and/or athlete that scored the goal), the next video in the playlist, and a remaining number of items in the playlist.

Additionally, or alternatively, the supplemental information may be related to the vehicle, the traffic, and/or the current geographical area around the vehicle. For example, display portions 304 and/or 310 may show traffic information (e.g., traffic updates), weather information, advertisement content, nearby fueling stations, and/or other information. For example, display portions 304 and 310 can display traffic indicators so that the driver can view display portion 302 and concurrently maintain awareness of the traffic movement. As an illustrative example, display portion 304 shows an indicator of the remaining time for a predicted stop duration at the location. As shown in FIG. 3, display portion 304 may comprise a countdown timer 306 and/or a timer icon 308. Countdown timer 306 may express the expected remaining wait time as a number (e.g., remaining seconds) or any other suitable format. Timer icon 308 may be an animated icon (e.g., an hourglass or stopwatch) that expresses the remaining wait time in a visual manner. Display portion 310 may be configured to show video of a traffic guidance indicator in proximity of the vehicle. As shown in FIG. 3, display portion 310 may comprise a real-time video 312 of a traffic light currently indicative of a stop. A descriptor 314 for video 312 may be included in display portion 310. Video of the traffic guidance indicator may be captured via a sensor (e.g., a camera) that is linked to the on-board vehicle systems and/or integrated with the in-vehicle systems. For example, video 312 may be captured through a traffic camera integrated in the rear-view mirror of the vehicle. In a second, non-limiting example, video 312 may be captured via a user's mobile device and provided to the in-vehicle systems.

In some embodiments, the content engine may determine and/or update the stop duration at the current location based on the video of the traffic guidance indicator. For example, video 312 may be analyzed using one or more machine vision techniques to determine how much longer the traffic light will indicate a stop or to detect whether the traffic light changes ahead of the predicted stop duration. In some embodiments, the content engine may access a traffic guidance system and request a remaining duration that the traffic light will be in stop mode. For example, the content engine may transmit the request for a traffic update including a request for the remaining wait time at the traffic light. Display portions 304 and 310 may supplement each another. For example, the content engine may update an indicator shown in display portion 304 based on an indicator from display portion 310. For example, the content engine may determine, based on video 312, an update of the stop duration and adjust countdown timer 306 and/or timer icon 308 based on the update.

The content engine may detect a particular event from media content and determine the corresponding content portion should be viewed based on user preferences. For example, the event may be from a live content stream. The user preferences may comprise an indication (e.g., a selected event type) to keep the user apprised of the particular event in the live content stream. For example, the event or its event type may be associated with a high importance level from the user preferences.

Figure 4:
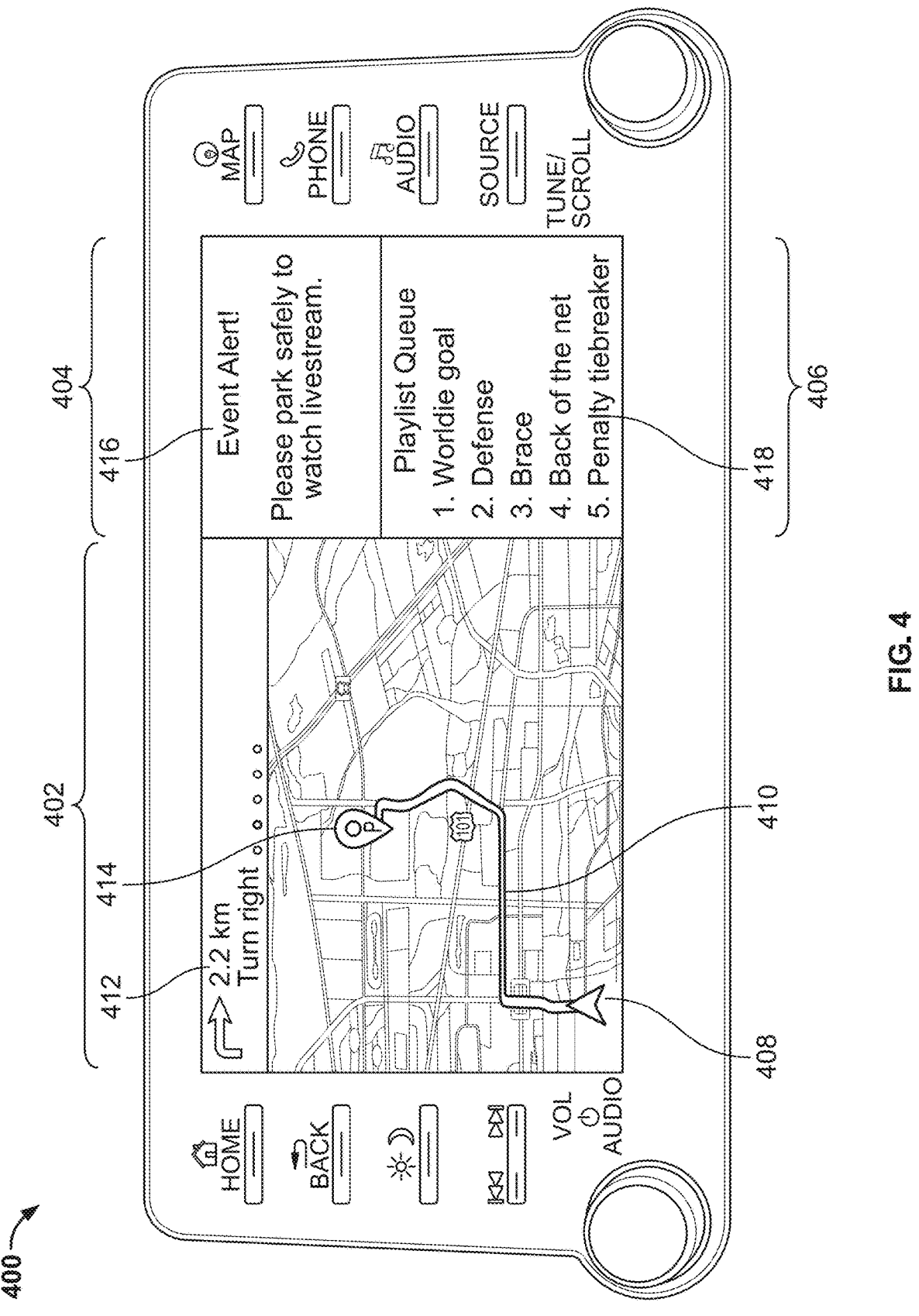
FIG. 4 shows an exemplary overlay for providing guidance to a location for viewing in-vehicle video content, in accordance with some embodiments of this disclosure.

FIG. 4 shows an exemplary overlay 400 for providing guidance to a location for viewing in-vehicle video content, in accordance with some embodiments of this disclosure. In an embodiment, the overlay 400 may be provided, in whole or in part, by the systems depicted in scenarios 100 and 200 (e.g., by the content engine 104, the display 132, or some combination thereof). Based on detecting the particular event, the content engine may identify a location for viewing video content and generate a recommendation indicating the location. The recommendation may comprise guidance to the location. For example, the content engine may determine that a first location does not satisfy the criteria for playing in-vehicle video and, in response, search for a second location. The content engine may search for a location that is within a particular distance. For example, the content engine may find a location based on reducing the deviation from a current route of the vehicle. For example, the second location may be in proximity to the vehicle, near to the first location, and/or along a route of the vehicle. The content engine may determine that the second location satisfies the criteria and generate for display a recommendation indicating the second location. As an illustrative example, the recommendation indicating the location may be displayed in overlay 400.

Overlay 400 comprises display portions 402, 404, and 406. Display portion 402 may be configured to provide guidance to a location for viewing video content. Display portion 404 may be configured to display a recommendation and/or indicate one or more content portion including identified events. Display portion 406 may be configured to display additional information, for example, about the media content, the identified events and/or information about corresponding video content portions. Display portion 402 comprises a navigation interface. The navigation interface may be integrated with the on-board vehicle navigation system, part of an application hosted on the in-vehicle system, and/or provided via a secondary device. Display portion 402 shows a current location 408 of the vehicle, a navigation prompt 412, and a route 410 to a location 414. Location 414 may be a location suitable for viewing video that is identified by the content engine. In embodiments where the vehicle is traveling a current route, navigation for the current route may be provided, for example, via the in-vehicle systems. The content engine may maintain navigation for the current route and suggest the identified location as a stop added to the current route. For example, a route to the identified location may be indicated as a branch from the current route.

Display portion 404 may be configured to provide a recommendation 416 to view the video content. For example, as shown in FIG. 4, upon detecting a content portion including an identified event, the content engine may generate for display an alert indicating that the detected content portion should be viewed based on the user's preferences. For example, display portion 404 may include an icon (not shown) for alerting the user. Recommendation 416 may suggest a location for viewing the video content. For example, display portion 404 may include an indication that navigation to the suggested location is provided in display portion 402.

Display portion 406 may be configured to provide supplemental information about the content portion and/or identified events in connection with recommendation 416. Some examples of the supplemental information are described regarding FIG. 3. As shown in FIG. 4, display portion 406 includes a playlist 418 generated using any of the systems and techniques described herein. The content engine may detect content portions corresponding to one or more events and adjust a video playlist in response to determining that the content portions corresponding to the events should be viewed based on user preferences. For example, the content engine may have added a video portion as item 1 to playlist 418 upon detecting occurrence of a goal-scoring event. For example, the content engine may have rearranged playlist 418 to move a video portion to the top of the queue as item 1. In some embodiments, display portion 406 may show a preview image (e.g., a still frame) depicting the detected event (not shown). For example, if the event is a defensive play by a preferred athlete from a sports media content item, the content engine may have display portion 406 show an image of the preferred player or an image of an instance of the defensive play.

In some embodiments, the content engine may generate a description of (or an event type for) a playlist item based on metadata of the corresponding video portions. For example, the metadata may indicate that the event is a defensive play. The content engine may add the content portion for the event to playlist 418 under the heading or event type "Defense" based on the metadata. In some embodiments, the content engine may indicate the queued video portions on a playlist using descriptive terms based on a user profile. For example, the user information of a user may include one or more references to prior goal-scoring events by a phrase, "worldie goal." The phrase "worldie goal" associated with the prior goal-scoring events may have been saved in the user's profile. The content engine may detect a goal-scoring event and determine that the goal-scoring event has a matching event type as the prior goal-scoring event. For example, the content engine may determine that a player performs similar actions as performed in the prior goal-scoring event. If the content engine detects such a goal-scoring event, the content engine may add a corresponding video portion to playlist 418 with the descriptive heading, "worldie goal."

Figure 5:
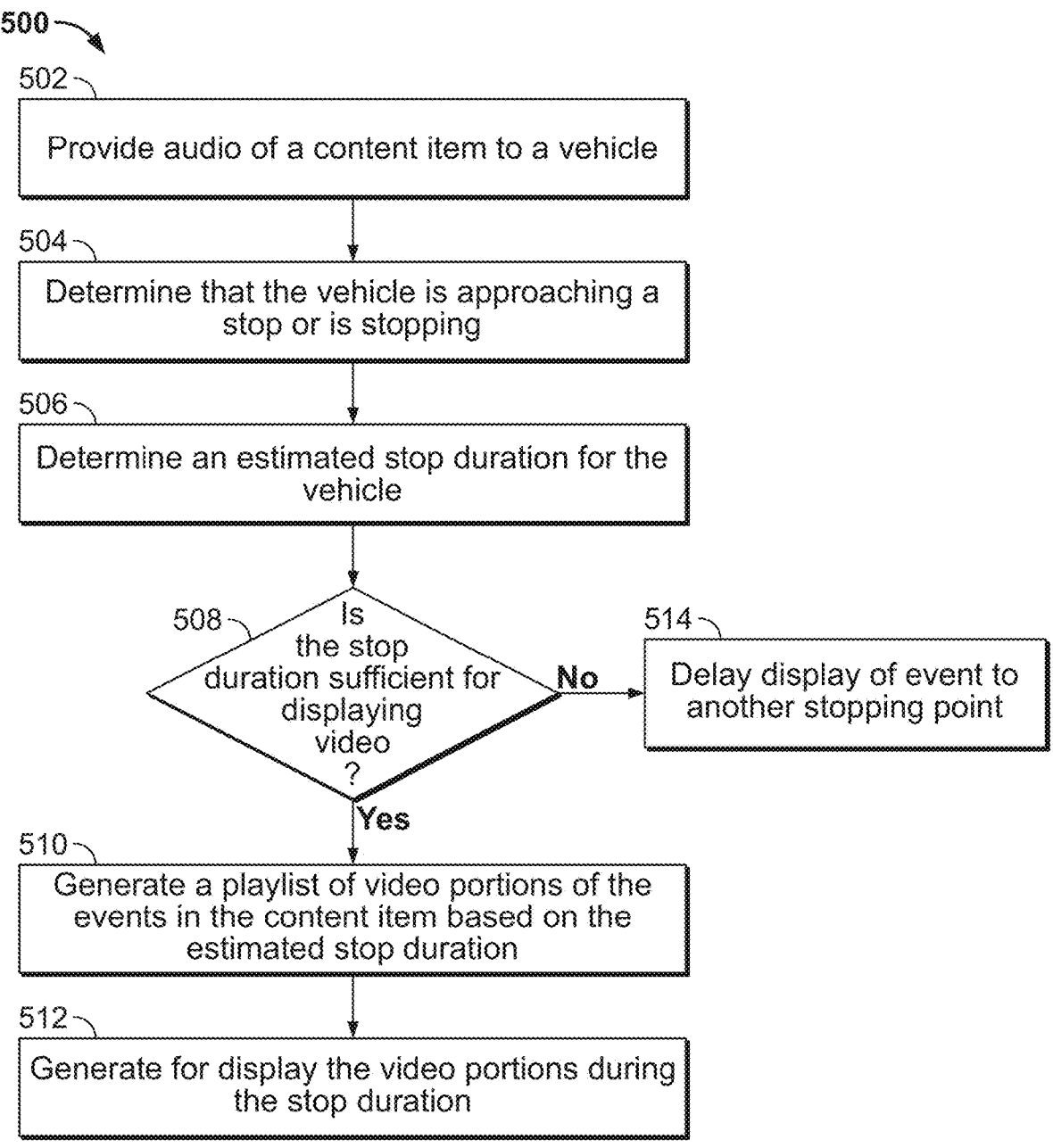
FIG. 5 is a flowchart of a process for providing in-vehicle content, in accordance with some embodiments of this disclosure.

FIG. 5 is a flowchart of an exemplary process 500 for providing in-vehicle content, in accordance with some embodiments of this disclosure. Process 500 may enable an automotive entertainment system to provide content, for example, as illustrated in scenario 100 and as described in FIG. 1. Process 500 may be executed via circuitry associated with the content engine to display video content, for example, as shown in overlay 300. For example, the process 500 may be implemented, in whole or in part, by the system 800 shown in FIG. 8. While control circuitry may be provided as an illustrative example in the following paragraphs and FIGS., it is noted that one or more actions regarding the systems and techniques described herein may be performed by another capable circuitry and/or any combination of circuitries including those shown in FIG. 8 without departing from the teachings of the present disclosure.

At 502, audio of a content item (e.g., as a content stream) may be provided to a vehicle. For example, the audio may be provided via audio output circuitry and/or control circuitry. For example, audio may be generated using input/output circuitry 812 and provided at an in-vehicle speaker system (not shown) at vehicles 102, 801. For example, the audio may belong to a live broadcast of a soccer game and include play-by-play commentary of the game. At 504, control circuitry may determine that the vehicle is approaching a location for stopping or that the vehicle is stopping at a location. For example, while the audio is playing, the vehicle may reach a traffic light indicative of a stop. In embodiments where the vehicle is traveling on a current route, determining that the vehicle is approaching the location may comprise determining the location based on analyzing a predetermined route of the vehicle (e.g., via a navigation system or API) and/or determining the location based on an analysis of a predicted route of the vehicle. At 506, control circuitry may determine a duration that the vehicle stops at the location. For example, control circuitry may calculate that the vehicle will be at the location for 1.5 minutes.

At 508, control circuitry may determine whether the stop duration is sufficient for playing video content. For example, control circuitry may determine whether the stop duration is above a threshold. For example, control circuitry may retrieve metadata for the content item, identify content portions including events that match the user preferences, and determine a threshold based on the identified content portions by determining an average and/or total duration of the content portions corresponding to the identified events. If the stop duration is insufficient to accommodate the content portions, control circuitry may delay presentation of video to another location at 514, for example, as described regarding delay 220. If the stop duration is sufficient, control circuitry may provide video for the content item. At 510, a playlist is generated including video portions from the content item, where the playlist may be generated based on the stop duration. For example, the playlist may be generated via control circuitry. For example, if the stop duration is 1.5 minutes, control circuitry may identify events and corresponding video portions from the content item based on the user preferences and select the corresponding video portions to generate a playlist not exceeding 1.5 minutes. In some embodiments, control circuitry may select a plurality of video portions from a playlist based on the stop duration and/or user preferences. At 512, the video portions may be generated for display, where the video portions are played while the vehicle is stopped. For example, display circuitry may generate and/or buffer the video portions for display and then display the video when the vehicle is stopped. For example, control circuitry may decode and buffer the video at any point while the vehicle is in driving mode and then display the video via the vehicle's infotainment console after the vehicle is stopped.

Figure 6:
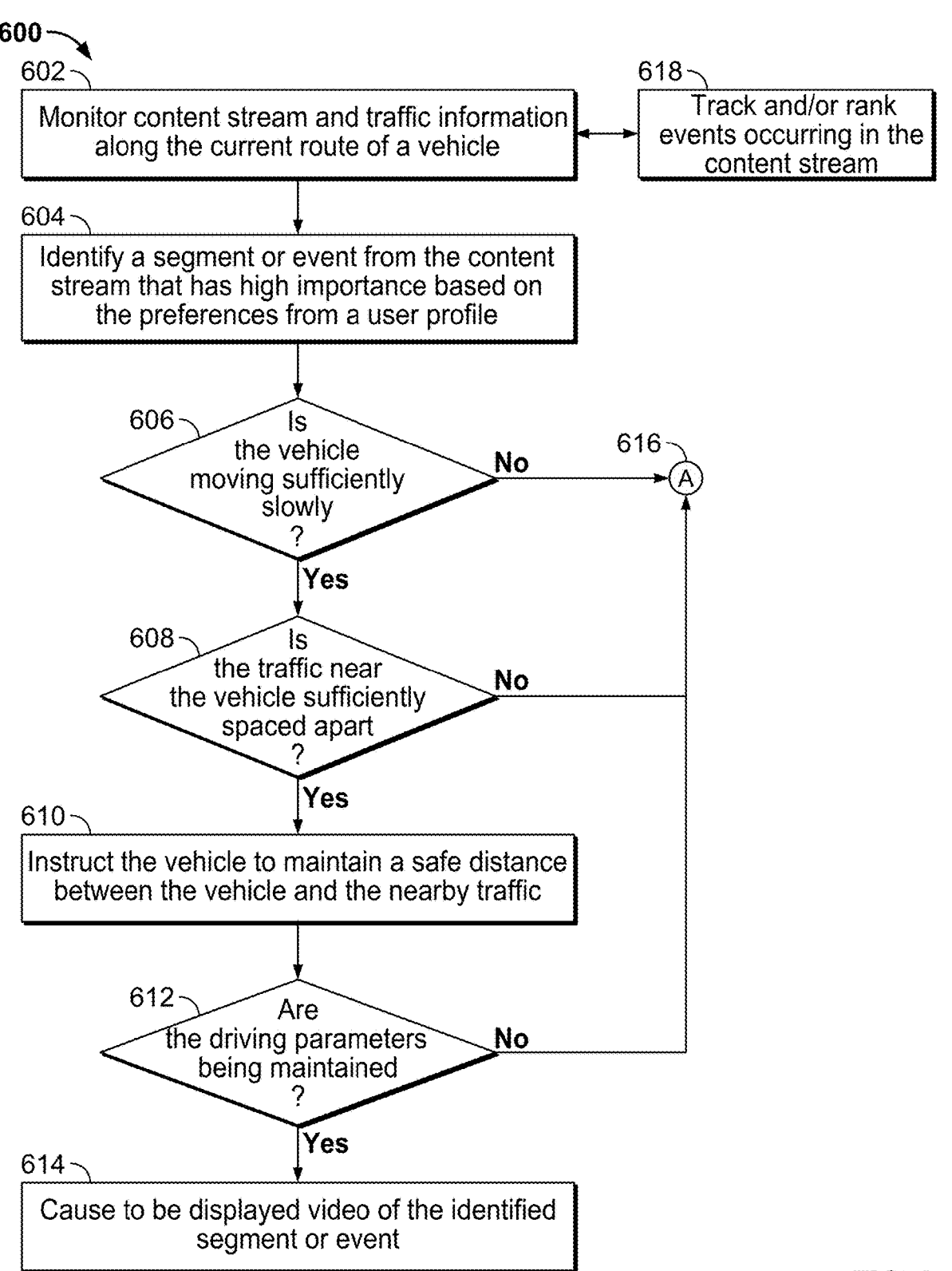
FIG. 6 is a flowchart of a process for automatically displaying in-vehicle video content, in accordance with some embodiments of this disclosure.

FIG. 6 is a flowchart of a process 600 for automatically displaying in-vehicle video content, in accordance with some embodiments of this disclosure. Process 600 may be executed via associated circuitry. For example, the process 600 may be implemented, in whole or in part, by the system 800 shown in FIG. 8. For example, one or more steps may be executed via a combination of processing circuitry 818, input/output circuitry 812, and/or display 810 with associated display circuitry. Process 600 may be applied for media content provided in various formats. As a non-limiting example, process 600 involves actions that may be performed for a content stream. At 602, control circuitry may monitor the content stream and various traffic circumstances from traffic information (e.g., data about live traffic updates) along a route of the vehicle. For example, the control circuitry may monitor and/or analyze the vehicle telemetry data. At 618, the control circuitry may track and/or rank content portions based on events occurring in the content stream. For example, if the content stream is an ongoing news report, control circuitry may identify different stories or news segments that may be of interest for the user, e.g., by comparing attributes of the identified segments with the user's profile. The control circuitry may rank the segments based on the user's content preferences. The highly ranked segments may be prioritized when selecting in-vehicle video portions for display. Control circuitry may perform 618 concurrently with 602 or in parallel with other actions of process 600 described herein.

At 604, control circuitry may identify a content portion including an event from the content stream. The control circuitry may determine that the event, or its event type, is associated with a high importance level based on a user profile. Based on identifying the event, the control circuitry may determine whether a set of criteria is satisfied for the vehicle. Some example criteria are described at 606, 608, and 612. If a criterion is not satisfied, control circuitry may proceed to 616, which is described further in connection with FIG. 7. At 606, control circuitry may determine whether the vehicle is moving at a slow pace and, in particular, whether the pace is sufficiently slow for displaying video. For example, the control circuitry may compare the vehicle's speed with a threshold as described regarding FIG. 5. For example, the control circuitry may calculate one or more metrics for the traffic in proximity to the vehicle. One or more of the vehicle's sensors may be employed to determine the metrics. An example metric may be a degree of variation in the traffic movement. Other traffic metrics may be calculated by the control circuitry in connection with determining the vehicle's pace.

At 608, control circuitry may determine whether the vehicle is sufficiently spaced apart from nearby traffic. For example, the control circuitry may determine how much distance is between the vehicle and the neighboring vehicles (e.g., using a nearest neighbor criterion). Additionally, or alternatively, the control circuitry may determine the variation in the spacing. One or more of the vehicle's sensors may be employed to measure relevant quantities for the distance and vehicle spacing. In some embodiments, if the traffic circumstances based on the traffic information satisfy the criteria, the control circuitry may instruct the on-board vehicle systems to maintain driving parameters (e.g., vehicle pace, spacing, direction, etc.) that keep the criteria satisfied. For example, if the criteria are satisfied at 606 and 608, control circuitry at 610 may instruct a vehicle's automated drive control to maintain the safe distance and spacing parameters. The vehicle telemetry, traffic information, and/or neighboring traffic may be optionally monitored to determine whether the driving parameters are maintained and/or expected to be maintained. For example, at 612, control circuitry may perform a supplementary check to determine whether the safe driving parameters are maintained and stable. As a second, non-limiting example, control circuitry may determine, based on the traffic information, whether the vehicle is approaching an area where the average traffic speed changes or would otherwise indicate if the driving parameters may or may not be maintained to keep the criteria satisfied. Control circuitry, display circuitry, and/or other circuitry may concurrently prepare the video of the event at any point after identifying the event. After determining the criteria are satisfied, at 614, control circuitry may cause to be displayed video portions such as video of the event from the content stream that is identified at 604. The actions described regarding process 600 may enable an automotive entertainment system to determine an opportune period to provide in-vehicle content while the vehicle is in driving mode.

FIG. 7 is a flowchart of a process 700 for providing guidance to view video content of an event, in accordance with some embodiments of this disclosure. Process 700 may be performed via associated circuitry, for example, to provide the guidance shown in overlay 400. For example, the process 700 may be implemented, in whole or in part, by the system 800 shown in FIG. 8. For example, an overlay may be generated for display using processing circuitry 818 and/or display circuitry associated with display 810. For example, communication circuitry 826 may receive information about the vehicle's current location via a global positioning system (GPS) and/or retrieve guidance information based on the current location. Processing circuitry 818 may generate the guidance and/or the overlay based on the current location and guidance information from communication circuitry 826. Process 700 may continue from any point after identifying a content portion including a selected event, for example, from a content stream. For example, at 702, process 700 may continue from 616 of FIG. 6 if a criterion for playing in-vehicle video is not satisfied. At 704, control circuitry may determine, based on the user preferences, a priority for the identified content portion. For example, the control circuitry may determine that the event or its event type is associated with a low priority level based on user information. If the event has a low priority level, at 716, control circuitry may delay display of video corresponding to the event and play the video at another stopping point. If the event or its event type has a high priority level, at 708, control circuitry may identify a location for stopping the vehicle. The control circuitry may search for a location near the current location of the vehicle. Additionally, or alternatively, the control circuitry may search along the current route of the vehicle. For example, the control circuitry may identify a parking spot along a side street to reduce the deviation from the current route.

At 710, control circuitry may determine whether in-vehicle video content can be played at the location. The vehicle may stop at the location to play in-vehicle video content. In some embodiments, the vehicle may continue moving at the location while satisfying the criteria as described regarding FIG. 6. If it is determined that video should not be played at the location, at 714, the control circuitry may generate for display an alert to indicate occurrence of the high-priority event. In a non-limiting example, the control circuitry may instruct display circuitry to generate the alert for display. Additionally, or alternatively, control circuitry may redo the search (not shown) to identify a location at 708. If video can be played at the location, at 712, a recommendation may be generated for display, where the recommendation indicates to stop at the location for viewing the video of the event (e.g., recommendation 416). For example, display circuitry may generate the recommendation for display at an in-vehicle console. Vehicle guidance may be generated and provided as part of the recommendation and/or in connection with the recommendation (e.g., shown in display portion 402). For example, control circuitry may generate the recommendation including vehicle guidance to the location.

FIG. 8 is a block diagram of an exemplary system 800 for providing in-vehicle content, in accordance with some embodiments of this disclosure. The vehicle system 800 may implement, in whole or in part, the functionality described with reference to scenarios 100 and 200 shown in FIGS. 1 and 2; it may provide the overlays 300 or 400 shown in FIGS. 3 and 4; and it may implement, in whole or in part, the functionality described with reference to methods 500, 600, and 700 shown in FIGS. 5-7. Although FIG. 8 shows a number and configuration of individual components, in some examples, any number of the components of system 800 may be combined and/or integrated as one device and/or as part of a vehicle. For example, all or some parts of the system 800 may be integrated with vehicle 801. System 800 may include computing device 802, server 804, and communication network 806 communicatively coupling device 802 and server 804. Device 802 and/or server 804 may also be communicatively coupled with one or more content databases (not shown) via communication network 806. In some examples, device 802 includes functionality that would otherwise be implemented by server 804. In other examples, server 804 works in conjunction with computing 802 to implement certain functionality described herein in a distributed or cooperative manner.

Server 804 includes control circuitry 834 and/or other components (not shown). Control circuitry 834 includes processing circuitry 836 and storage 838. Communication network 806 may include one or more network systems, such as, without limitation, Internet, LAN, Wi-Fi or other network systems suitable for audio processing applications. In some embodiments, all communications may occur over a single communication network or distributed over multiple communication networks. Features and operations described herein in connection with communication network 806 may be performed by any combination of communication networks described herein. In an embodiment, the content engine 104 shown in FIG. 1 is implemented, in whole or in part, by the server 804 or by a similar server.

Computing device 802 includes control circuitry 808, display 810 and input/output circuitry 812. Computing device 802 receives user input 814 at input/output circuitry 812. For example, computing device 802 may receive a user input such as a user swipe or user touch. Control circuitry 808 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 808 in turn includes communication circuitry 826, storage 822 and processing circuitry 818. In some embodiments, computing device 802 or control circuitry 808 may be configured as varying embodiments, or combinations of varying embodiments, of scenario 100 of FIG. 1 and scenario 200 of FIG. 2 configured to execute the various methods as well as incorporate the various features, processes, and interfaces depicted in FIGS. 3-7. For example, in an embodiment, the computing device 802 may output some or all of the media content 106 via display 132 and/or the audio output device 126. In an embodiment, the display 132 and/or audio output device 126 may be a component of the computing device 802 (e.g., the display 810 may be an example embodiment of the display 132). In an embodiment, the display 132 and/or the audio output device 126 is not a component of the computing device 802 (e.g., the computing device 802 may be a mobile device, the display 132 may be an integrated display for the vehicle, and the audio output device 126 may be an integrated audio output system for the vehicle). In an embodiment, the content engine 104 shown in FIG. 1 is implemented, in whole or in part, by the device 802 or by a similar server.

In addition to control circuitry 808 and 834, computing device 802 and server 804 may each include storage (storage 822, and storage 838, respectively). Each of storages 822 and 838 may be an electronic storage device. As referred to herein, the phrase "electronic storage device" or "storage device" should be understood to mean any device for storing electronic data, computer software, or firmware, such as random-access memory, read-only memory, hard drives, optical drives, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 822 and 838 may be used to store various types of content, metadata, and/or other types of data. Non-volatile memory may also be used (e.g., to launch a boot-up routine and other instructions). Cloud-based storage may be used to supplement storages 822 and 838 or instead of storages 822 and 838.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc. In some embodiments, control circuitry 808 and/or 834 executes instructions for an application stored in memory (e.g., storage 822 and/or storage 838). Specifically, control circuitry 808 and/or 834 may be instructed by the application to perform the functions discussed herein. For example, system 800 may include a non-transitory computer-readable medium storing such instructions that, when executed by control circuitry 808 and/or 834, may cause the control circuitry, or another circuitry, to perform the various actions described herein. In some implementations, any action performed by control circuitry 808 and/or 834 may be based on instructions received from the application. For example, the application may be implemented as software or a set of executable instructions that may be stored in storage 822 and/or 838 and executed by control circuitry 808 and/or 834. In some embodiments, the application may be a client/server application where only a client application resides on computing device 802, and a server application resides on server 804.

The application may be implemented using any suitable architecture. For example, it may be a stand-alone application wholly implemented on computing device 802. In such an approach, instructions for the application are stored locally (e.g., in storage 822), and data for use by the application is downloaded on a periodic basis (e.g., from an out-of-band feed, from an Internet resource, or using another suitable approach). Control circuitry 808 may retrieve instructions for the application from storage 822 and process the instructions to perform the functionality described herein. Based on the processed instructions, control circuitry 808 may determine a type of action to perform in response to input received from input/output circuitry 812 or from communication networks 806.

In client/server-based embodiments, control circuitry 808 may include communication circuitry suitable for communicating with an application server (e.g., server 804) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 806). In another example of a client/server-based application, control circuitry 808 runs a web browser that interprets web pages provided by a remote server (e.g., server 804). For example, the remote server may store the instructions for the application in a storage device. The remote server may process the stored instructions using circuitry (e.g., control circuitry 834) and/or generate displays. Computing device 802 may receive the displays generated by the remote server and may display the content of the displays locally via display 810. This way, the processing of the instructions is performed remotely (e.g., by server 804) while the resulting displays, such as the display windows described elsewhere herein, are provided locally on computing device 804. Computing device 802 may receive inputs from the user via input/output circuitry 812 and transmit those inputs to the remote server for processing and generating the corresponding displays. Alternatively, computing device 802 may receive inputs from the user via input/output circuitry 812 and process and display the received inputs locally, by control circuitry 808 and display 810, respectively.

Server 804 and computing device 802 may transmit and receive content and data such as media content via communication network 806. For example, server 804 may be media content provider, and computing device 802 may be a vehicle infotainment system configured to download or stream media content, such as a live news broadcast, from server 804. Control circuitry 834, 808 may send and receive commands, requests, and other suitable data through communication network 806 using communication circuitry 832, 826, respectively. Although not shown, control circuitry 834, 808 may communicate directly with each other using communication circuitry 832, 826, respectively.

It is understood that computing device 802 is not limited to the embodiments and methods shown and described herein. Computing device 802 may be any type of computing device integrated, or communicatively coupled, with the on-board systems of vehicle 801. In non-limiting examples, computing device 802 may be a television, a Smart TV, a set-top box, an integrated receiver decoder (IRD) for handling satellite television, a digital storage device, a digital media receiver (DMR), a digital media adapter (DMA), a streaming media device, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

In an embodiment, the display 810 may be any suitable electronic visual display device that that is configured to provide visual output in the form of images, text, or video. For example, in some embodiments, the display device 810 may be any display, screen, monitor, or projector suitable for displaying visual output. Example displays 810 include LED screens, LCD screens, CRT screens, projectors, heads up displays (e.g., projected onto the windshield of a vehicle), smart watch displays, headset displays (e.g., VR goggles), etc. Depending on the embodiment, the display device 810 may be configured for touch input or may not be configured for touch input. In an embodiment, the display 810 is integrated into a console or dashboard of a vehicle (e.g., serving as a primary display for in-vehicle infotainment system). In some embodiments, the display 810 may be permanently or semi-permanently installed or mounted. In some embodiments, the display 810 may be mounted such that it is removable, if desired. In an embodiment, the display 132 shown in FIG. 1 may be the display 810 or may be a display similar to the display 810.

User input 814 may be received from a user selection-capturing interface that is separate from device 802, such as a remote-control device, trackpad or any other suitable user movement-sensitive, audio-sensitive or capture devices, or as part of device 802, such as a touchscreen of display 810. Transmission of user input 814 to computing device 802 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 812 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 818 may receive user input 814 from input/output circuitry 812 using communication path 816. Processing circuitry 818 may convert or translate the received user input 814 that may be in the form of audio data, visual data, gestures or movement to digital signals. In some embodiments, input/output circuitry 812 performs the translation to digital signals. In some embodiments, processing circuitry 818 (or processing circuitry 836, as the case may be) carries out disclosed processes and methods.

Processing circuitry 818 may provide requests to storage 822 by communication path 820. Storage 822 may provide requested information to processing circuitry 818 by communication path 846. Storage 822 may transfer a request for information to communication circuitry 826 which may translate or encode the request for information to a format receivable by communication network 806 before transferring the request for information by communication path 828. Communication network 806 may forward the translated or encoded request for information to communication circuitry 832, by communication paths 830.

At communication circuitry 832, the translated or encoded request for information, received through communication path 830, is translated or decoded for processing circuitry 836, which will provide a response to the request for information based on information available through control circuitry 834 or storage 838, or a combination thereof. The response to the request for information is then provided back to communication network 806 by communication path 840 in an encoded or translated format such that communication network 806 can forward the encoded or translated response back to communication circuitry 826 by communication path 842.

At communication circuitry 826, the encoded or translated response to the request for information may be provided directly back to processing circuitry 818 by communication path 854, or may be provided to storage 822 through communication path 844, which then provides the information to processing circuitry 818 by communication path 846. Processing circuitry 818 may also provide a request for information directly to communication circuitry 826 though communication path 852, where storage 826 responds to an information request, provided through communication path 820 or 844, by communication path 824 or 846 that storage 822 does not contain information pertaining to the request from processing circuitry 818.

Processing circuitry 818 may process the response to the request received through communication paths 846 or 854 and may provide instructions to display 810 for a notification to be provided to the users through communication path 848. Display 810 may incorporate a timer for providing the notification or may rely on inputs through input/output circuitry 812 from the user, which are forwarded through processing circuitry 818 through communication path 848, to determine how long or in what format to provide the notification. When display 810 determines the display has been completed, a notification may be provided to processing circuitry 818 through communication path 850.

The communication paths provided in FIG. 8 between computing device 802, server 804, communication network 806, and all subcomponents depicted are exemplary and may be modified to reduce processing time or enhance processing capabilities for each step in the processes disclosed herein by one skilled in the art.

FIG. 9 depicts a vehicle system 900 including example components for providing in-vehicle content, in accordance with some embodiments of the disclosure. Although vehicle system 900 depicts certain components, circuitries and/or devices, vehicle system 900 may comprise any or all of the components, circuitries, devices and/or combinations thereof described regarding FIGS. 1-4, 8. For example, vehicle system 900 may be included in vehicles 102, 24, 206, and/or 801. For example, some or all parts of system 800 may be integrated with vehicle system 900. For example, vehicle system 900 may be all or partially separate from system 800, but some or all components of vehicle system 900 may be operating in conjunction with some or all components of system 800. Additionally, vehicle system 900 may be configured to execute any or all of the steps depicted in the methods disclosed in FIGS. 5-7. For example, one or more of apparatuses 922, 924, 926, 928 may be involved in collecting vehicle and nearby traffic information and/or analyzing vehicle telemetry. For example, one or more of apparatuses 922, 924, 926, 928, and/or vehicle body 902 may include sensor units and other devices that collect information about the vehicle such as a speedometer sensor (e.g., unit 944 as part of front camera/sensor apparatus 926), an inertial measurement unit (IMU; e.g., unit 946 as part of vehicle propulsion/steering unit), etc. It is understood that units 944 and 946 and other such devices are intended to be illustrative examples and non-limiting. In particular, these devices may be stand-alone units or part of any of the disclosed systems. Such devices may collect data that indicate vehicle speed, acceleration, direction, etc. This collected information and/or vehicle telemetry may be used to determine whether the vehicle is approaching a location for stopping, whether the vehicle has stopped, and/or whether the vehicle is changing state such that it is no longer stopped. For example, a downward trend in velocity (e.g., observed based on a speedometer sensor unit 944 in communication with the central vehicle processing module 904) indicates the vehicle is approaching a location for stopping. A velocity of zero may indicate the vehicle is stopped. An increase in velocity may indicate the vehicle is no longer stopped. In an embodiment, this information enables the systems 800 and/or 900 to determine that the vehicle is approaching a location for stopping and, in response, begin calculating a stop duration and to begin generating a playlist. Similarly, in an embodiment, this information enables the systems 800 and/or 900 to determine that the vehicle has stopped and, in response, to begin generating for display video portions from the generated playlist. Alternatively, or additionally, other information may be utilized to inform determinations regarding a vehicle stopping or approaching stopping (e.g., patterns observed from historical data, navigation data pertaining to a current or past route, current traffic data, etc.).

Vehicle system 900 comprises integrated system components (e.g., PCBs, sensors, wires, connectors, networking parts, etc.) that may be distributed throughout a vehicle body and used to support executing various functions (e.g., proximity detection, collecting telemetry data, interconnecting the vehicle components, circuitries and/or devices, etc.). These system parts distributed throughout the vehicle body may be collectively referred to as vehicle body 902. Vehicle body 902 may serve as an illustrative collective system for any one or more of the vehicles described herein in various embodiments (e.g., the vehicles 102, 204, 206, 801, etc.). It is noted that such components may be numerous and/or implemented in various configurations in some vehicle systems. To avoid overcomplicating the drawings and corresponding description, it should be understood that reference to vehicle body 902 may include or be a reference to some or all of the distributed components, which may be operating as a stand-alone unit and/or in conjunction with other systems and/or apparatuses, to support one or more of the disclosed systems and/or execute one or more steps of the disclosed processes and other functions. For example, vehicle body 902 may refer to an in-vehicle network and its network components (e.g., wireless transceivers, hubs, routers, etc.) for communicatively coupling some or all of the in-vehicle system modules. Vehicle body 902 is configured to enable communication between central vehicle processing module 904, vehicle transmission 906, and vehicle propulsion/steering unit 908. Vehicle processing module 904 is configured to transmit commands or instructions to various depicted modules, apparatus, and/or circuitries within vehicle body 902 based on data received from internal and external sources (e.g., from sensor units coupled to the various modules, apparatus, and/or circuitries depicted or from computing device 910 and/or computing device 802 of FIG. 8). Computing device 910 is communicatively coupled or paired with vehicle body 902, and, more particularly, is configured to transmit and receive data to and from central vehicle processing module 904 via a communication network comprising message out/command in circuitry 914, communication network 912, and bilateral communication streams 916 and 918. For example, central vehicle processing module 904 may comprise computer readable instructions for regulating and initiating various active and passive operations including automated and/or autonomous functions of vehicle system 900. Additionally, computing device 910 may be configured to transmit instructions based on user inputs at computing device 910 to influence or modify the operations of vehicle system 900 by transmitting data via communication stream 918 through communication network 912 to be received at message out/command in circuitry 914 which translates external messages to a readable medium for central vehicle processing module 904 through vehicle communication network stream 920.

In some embodiments, central vehicle processing module 904 is integrated into a vehicle communication network configured to transmit messages between the various modules, control circuitries and apparatus. For example, the vehicle communication network may comprise a plurality of wireless or ethernet transmission and reception nodes. The vehicle communication network may comprise a Controller Area Network (hereinafter "CAN bus"), corresponding to a robust vehicle bus standard designed to allow microcontrollers and devices to communicate with each other's applications without a host computer. It may include a message-based protocol, designed originally for multiplex electrical wiring within vehicle networks. For each device, the data in a frame is transmitted sequentially but in such a way that if more than one device transmits at the same time, the highest priority device can continue while the others back off (e.g., commands from central vehicle processing module 904 are given higher priority than data received from side camera/sensor apparatus 922. Frames may be received by all devices shown in FIG. 9 or some devices of vehicle system 900, including by a transmitting device, to determine if transmitted messages or commands are being altered throughout the CAN bus. The amount of data transmitted and received by each device may be a function of the operational protocols of vehicle system 900 (e.g., certain devices may only have access to a limited portion of the CAN bus to prevent a risk of data or message modification through error stack up during processing).

As shown in FIG. 9, each of rear camera/sensor apparatus 924, side camera/sensor apparatus 922, front camera/sensor apparatus 926, and vehicle interior monitoring apparatus 928 provide data via each of unilateral communication streams 930, 932, 936, and 934. It is understood that in some embodiments, each of unilateral communication streams 930, 932, 936, and 934, although not depicted, may comprise bilateral communication streams if each of rear camera/sensor apparatus 924, side camera/sensor apparatus 922, front camera/sensor apparatus 926, and vehicle interior monitoring apparatus 928 comprise modules configured to be in different transmitting and receiving states based on protocols corresponding to individual states of vehicle system 900 (e.g., in some embodiments, each apparatus may have activation or deactivation protocols as determined by central vehicle processing module 904 depending on which other modules or apparatus in vehicle system 900 is active or transmitting/receiving data). Each of each of unilateral communication streams 930, 932, 936, and 934 may comprise security protocols to prevent external or unintended source from modifying or adding signals or data transmitted and received via each communication stream.

Central vehicle processing module 904 is shown having bilateral communication streams 938 and 940 coupled to vehicle propulsion/steering unit 908 and vehicle transmission 906, respectively. Each of vehicle propulsion/steering unit 908 and vehicle transmission 906 may be configured to receive autonomous operation instructions from central vehicle processing module 904. Additionally, vehicle propulsion/steering unit 908 and vehicle transmission 906 are communicatively coupled on the CAN bus via bilateral communication stream 942. Bilateral communication streams or unilateral communication streams may comprise security protocols and bus loads contingent on the amount of data that needs to be shared between modules and apparatus depicted in order to adequately and safely enable autonomous functions of vehicle system 900.

The systems and processes described herein are intended to be illustrative and not limiting. One skilled in the art would appreciate that the system components and/or steps of the processes discussed herein may be suitably substituted, omitted, modified, combined and/or rearranged. Components and/or steps may be added without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
while a vehicle is in motion:
 providing audio of media content to the vehicle;
 determining that the vehicle is approaching a location for stopping;
 calculating, based at least in part on historical traffic data or current traffic data, a predicted stop duration during which the vehicle will be stopped at the location; and
 generating a playlist of video portions of the media content based on the predicted stop duration;
detecting that the vehicle has stopped at the location; and
generating for display the video portions for displaying while the vehicle is stopped at the location.

2. The method of claim 1, wherein the audio of the media content is provided to an interior environment of the vehicle via at least one of a mobile device or an in-vehicle infotainment system.

3. The method of claim 1, wherein the media content comprises streaming content, and wherein the generating for display comprises generating for display video of the streaming content for displaying while the vehicle is stopped.

4. The method of claim 1, wherein the location is along a route of the vehicle, and wherein the determining that the vehicle is approaching the location comprises one of:
 (i) determining the location based on analyzing a predetermined route of the vehicle via a navigation system;
 (ii) determining the location based on an analysis of a predicted route of the vehicle; or
 (iii) analyzing vehicle telemetry data.

5. The method of claim 1, wherein calculating the predicted stop duration comprises:
 accessing historical traffic data comprising traffic information corresponding to a plurality of vehicle stop durations at the location;
 determining current traffic information for the vehicle; and
 calculating the predicted stop duration based on the plurality of vehicle stop durations and the determined current traffic information.

6. The method of claim 1, wherein generating the playlist of the video portions based on the predicted stop duration comprises selecting the video portions based on selected events depicted in the video portions.

7. The method of claim 6, wherein the media content is a sports media content, and wherein the playlist includes one or more video portions depicting a scoring event in the sports media content.

8. The method of claim 1, further comprising, prior to the vehicle stopping at the location, buffering one or more of the video portions in local memory for playing at the location.

9. The method of claim 1, wherein the method further comprises:
 generating, for concurrent display with the video portions, an indicator corresponding to a countdown of a remaining duration for the video portions.

10. The method of claim 1, wherein the method further comprises:
 generating for display an indicator corresponding to a countdown of the predicted stop duration.

11. The method of claim 1, wherein the location is proximate to a traffic light, the method further comprising:
 generating for display video of the traffic light indicative of a stop duration for the vehicle.

12. A system comprising:
display circuitry configured to generate for display video content; and
control circuitry configured to:
 while a vehicle is in motion:
  provide audio of media content to the vehicle;
  determine that the vehicle is approaching a location for stopping;
  calculate, based at least in part on historical traffic data or current traffic data, a predicted stop duration during which the vehicle will be stopped at the location; and
  generate a playlist of video portions of the media content based on the predicted stop duration;
 detect that the vehicle has stopped at the location; and
 generate for display, via the display circuitry, the video portions for displaying while the vehicle is stopped at the location.

13. The system of claim 12, wherein the audio of the media content is provided to an interior environment of the vehicle via at least one of a mobile device or an in-vehicle infotainment system.

14. The system of claim 12, wherein the media content comprises streaming content, and wherein the control circuitry is configured to generate for display video of the streaming content for displaying while the vehicle is stopped.

15. The system of claim 12, wherein the location is along a route of the vehicle, and wherein the control circuitry is configured to determine that the vehicle is approaching the location by one of:
 (i) determining the location based on analyzing a predetermined route of the vehicle via a navigation system;
 (ii) determining the location based on an analysis of a predicted route of the vehicle; or
 (iii) analyzing vehicle telemetry data.

16. The system of claim 12, wherein the control circuitry, when calculating the predicted stop duration, is configured to:
 access historical traffic data comprising traffic information corresponding to a plurality of vehicle stop durations at the location;
 determine current traffic information for the vehicle; and calculate the predicted stop duration based on the plurality
of vehicle stop durations and the determined current
traffic information.

17. The system of claim 12, wherein the control circuitry,
when generating the playlist of the video portions based on
the predicted stop duration, is configured to select the video
portions based on selected events depicted in the video
portions.

18. The system of claim 17, wherein the media content is
a sports media content, and wherein the playlist includes one
or more video portions depicting a scoring event in the
sports media content.

19. The system of claim 12, wherein the control circuitry
is further configured to, prior to the vehicle stopping at the
location, buffer one or more of the video portions in local
memory for playing at the location.

20. The system of claim 12, wherein the control circuitry
is further configured to:

generate, for concurrent display with the video portions,
an indicator corresponding to a countdown of a remaining duration for the video portions.

\* \* \* \* \*